US008588429B2

(12) United States Patent
Tanaka

(10) Patent No.: US 8,588,429 B2

(45) Date of Patent: Nov. 19, 2013

(54) SOUND DEVICE AND SOUND CONTROL DEVICE

(75) Inventor: Masako Tanaka, Kobe (JP)

(73) Assignee: Kawasaki Jukogyo Kabushiki Kaisha, Kobe (JP)

( * ) Notice: Subject to any disclaimer, the term of this patent is extended or adjusted under 35 U.S.C. 154(b) by 456 days.

(21) Appl. No.: 12/863,704

(22) PCT Filed: Jan. 23, 2009

(86) PCT No.: PCT/JP2009/051103

§ 371 (c)(1), (2), (4) Date: Jul. 20, 2010

(87) PCT Pub. No.: WO2009/093702

PCT Pub. Date: Jul. 30, 2009

(65) Prior Publication Data

US 2010/0296659 A1 Nov. 25, 2010

(30) Foreign Application Priority Data

Jan. 25, 2008 (JP) ................................ 2008-015653

(51) Int. Cl.
*H03G 3/20* (2006.01)

(52) U.S. Cl.
USPC ................ 381/57; 381/56; 381/92; 381/71.1; 381/71.12; 381/71.4; 381/106; 381/107; 381/108; 381/73.1; 381/94.1; 704/219; 704/226; 704/227; 704/228

(58) Field of Classification Search
USPC ......... 381/56, 57, 92, 94.1, 71.1, 71.12, 71.4, 381/106, 107, 108, 73.1; 704/219, 226–228
See application file for complete search history.

(56) References Cited

U.S. PATENT DOCUMENTS 4,644,292 A * 2/1987 Kunugi et al. ................ 330/279
5,058,171 A * 10/1991 Wurzer et al. .................. 381/92

(Continued)

FOREIGN PATENT DOCUMENTS

EP 1 531 605 A1 5/2005
JP B2-2541062 10/1996

(Continued)

OTHER PUBLICATIONS

International Search Report in International Application No. PCT/JP2009/051103; dated May 26, 2009 (with English-language translation).

(Continued)

*Primary Examiner* — Mohammad Islam
*Assistant Examiner* — Kuassi Ganmavo
(74) *Attorney, Agent, or Firm* — Oliff & Berridge, PLC

(57) ABSTRACT

The sound device includes an audio-information output unit, an analysis unit, an audio-division-spectrum output unit, a noise-division-spectrum output unit and a correction unit. The analysis unit receives audio information from the audio-information output unit, and then outputs sound spectrum information. The noise-division-spectrum output unit outputs sound-volume information for each critical band width of a noise, and the audio-division-spectrum output unit outputs the sound-volume information for each critical band width of the sound-spectrum information. The correction unit corrects the information from the audio-division-spectrum output unit based on the information from the noise-division-spectrum output unit. The audio-signal properties can be well corrected corresponding to the auditory-sense properties of the human, and thus the audio sound, in which an uncomfortable feeling to the auditory sense of the human has been adequately controlled, can be transmitted to a user.

2 Claims, 8 Drawing Sheets

(56) References Cited

U.S. PATENT DOCUMENTS

| | | | | |
|---|---|---|---|---|
| 5,204,971 | A * | 4/1993 | Takahashi et al. | 455/185.1 |
| 5,509,081 | A * | 4/1996 | Kuusama | 381/103 |
| 6,144,937 | A * | 11/2000 | Ali | 704/233 |
| 6,351,727 | B1 * | 2/2002 | Wiese et al. | 704/201 |
| 7,333,618 | B2 * | 2/2008 | Shuttleworth et al. | 381/57 |
| 7,486,797 | B2 * | 2/2009 | Marumoto et al. | 381/57 |
| 7,516,065 | B2 * | 4/2009 | Marumoto | 704/215 |
| 2002/0069748 | A1 | 6/2002 | Suda | |
| 2003/0198357 | A1 * | 10/2003 | Schneider et al. | 381/94.2 |
| 2004/0078199 | A1 | 4/2004 | Kremer et al. | |
| 2004/0125962 | A1 * | 7/2004 | Christoph | 381/59 |
| 2005/0058301 | A1 | 3/2005 | Brown | |
| 2005/0071156 | A1 | 3/2005 | Xu et al. | |
| 2005/0240401 | A1 | 10/2005 | Ebenezer | |
| 2007/0019825 | A1 * | 1/2007 | Marumoto et al. | 381/94.1 |
| 2007/0291957 | A1 * | 12/2007 | Khan | 381/86 |

FOREIGN PATENT DOCUMENTS

| | | |
|---|---|---|
| JP | A-09-232896 | 9/1997 |
| JP | A-2000-270392 | 9/2000 |
| JP | A-2001-013977 | 1/2001 |
| JP | A-2002-140072 | 5/2002 |
| JP | A-2002-314637 | 10/2002 |
| JP | 2003244785 A * | 8/2003 |
| JP | 2004297747 A * | 10/2004 |
| WO | WO 02067418 A1 * | 8/2002 |

OTHER PUBLICATIONS

International Preliminary Report on Patentability in International Application No. PCT/JP2009/051103; dated Aug. 31, 2010.

Apr. 16, 2012 Extended Search Report issued in European Patent Application No. 09704007.5.

* cited by examiner

SOUND DEVICE AND SOUND CONTROL DEVICE

TECHNICAL FIELD

The present invention relates to a sound device and a sound control device, respectively adapted for correcting a sound spectrum of a tone with respect to an audio sound under a noisy environment.

BACKGROUND ART

In recent years, the development of the sound device that can clearly transmit the audio sound to a user even under the noisy environment has been advanced. For instance, JP2541062B (Patent Document 1) proposes a technique for correcting sound-signal properties, in view of the auditory-sense properties of the human (or user), while appropriately corresponding to changes of an external noise.

FIG. 10 shows a block diagram illustrating the construction of a sound (or audio) playback unit 1 (i.e., the sound device) related to the above Patent Document 1. This sound playback unit 1 includes a sound signal source 2 adapted for producing sound signals, an external-sound capturing means 3 adapted for capturing a surrounding noise, an external-sound auditory-sense-property calculation means 4 adapted for analyzing each sound for each frequency band, and an equalizer 5 capable of amplifying the sound for each frequency band.

Namely, in the sound playback unit 1, a surrounding sound is first captured by the external-sound capturing means 3, and then analyzed by the external-sound auditory-sense-property calculation means 4. Subsequently, the equalizer 5 is controlled, corresponding to the result of the analysis, to allow each sound signal outputted from the sound signal source 2 to be amplified by an amplifier 6 for each different frequency band, and then outputted from a speaker 7.

More specifically, in this sound playback unit 1, the external-sound auditory-sense-property calculation means 4 can serve to extract a sound component masked by a noise component and exceeding a certain or reference audible limit curve from each sound signal that has been captured by the external-sound capturing means 3 and then compensated or corrected for the frequency properties thereof by a property-correction circuit 8. Thereafter, a comparison circuit 10 compares the so-extracted sound component with another sound component which also exceeds the audible limit curve and is separately extracted by a sound-signal auditory-sense-property calculation circuit 9. In this way, a damping ratio of the sound component due to the noise can be obtained. In this case, undue change of such a calculated damping ratio can be suppressed by a low-pass filter (or LPF) 11. Then, based on each result of such operations, the amplification due to the equalizer 5 can be properly controlled, thereby correcting the sound signal properties corresponding to the changes of the surrounding noise.

Namely, in the above sound playback unit 1 related to the related art, the external-sound auditory-sense-property calculation means 4 can serve to calculate an amplification factor of each sound signal for each different frequency band based on the reference audible limit curve. However, this amplification factor is obtained only for addition or subtraction for the sound volume based on the analysis and comparison between the inputted external sound relative to the sound signal to be outputted. In other words, this sound playback unit 1, as described in the above Patent Document 1, is intended only for controlling the increase or decrease of the sound volume in such a simple manner that may tend to cause a rather uncomfortable feeling to the auditory sense of the user. Besides, this device requires unduly much time for catching and analyzing the external sound.

DISCLOSURE OF INVENTION

Therefore, it is an object of the present invention to provide a new sound device and an improved sound control device which can well correct the properties of each audio signal corresponding to the auditory-sense properties of the human, and thus can transmit the audio sound to the user with the uncomfortable feeling of the audio sound to the auditory sense having being adequately suppressed.

The sound device of this invention includes: an audio-information output unit, an analysis unit, an audio-division-spectrum output unit, a noise-division-spectrum output unit and a correction unit. The analysis unit is configured to output sound spectrum information of audio information outputted from the audio-information output unit. The audio-division-spectrum output unit is configured to output audio-division-spectrum information indicative of sound-volume information for each critical band width of the sound-spectrum information.

The noise-division-spectrum output unit is configured to output noise-division-spectrum information indicative of the sound-volume information for each critical band width of the noise. The correction unit is configured to correct the audio-division-spectrum information based on the noise-division-spectrum information, and then output therefrom correction-division-spectrum information.

EFFECTS OF INVENTION

Thus, according to the sound device and sound control device of this invention, the audio-signal properties can be well corrected corresponding to the auditory-sense properties of the human, as such the audio sound with the uncomfortable feeling thereof to the auditory sense having been adequately controlled can be transmitted to the user.

BEST MODE FOR CARRYING OUT THE INVENTION

Figure 1:
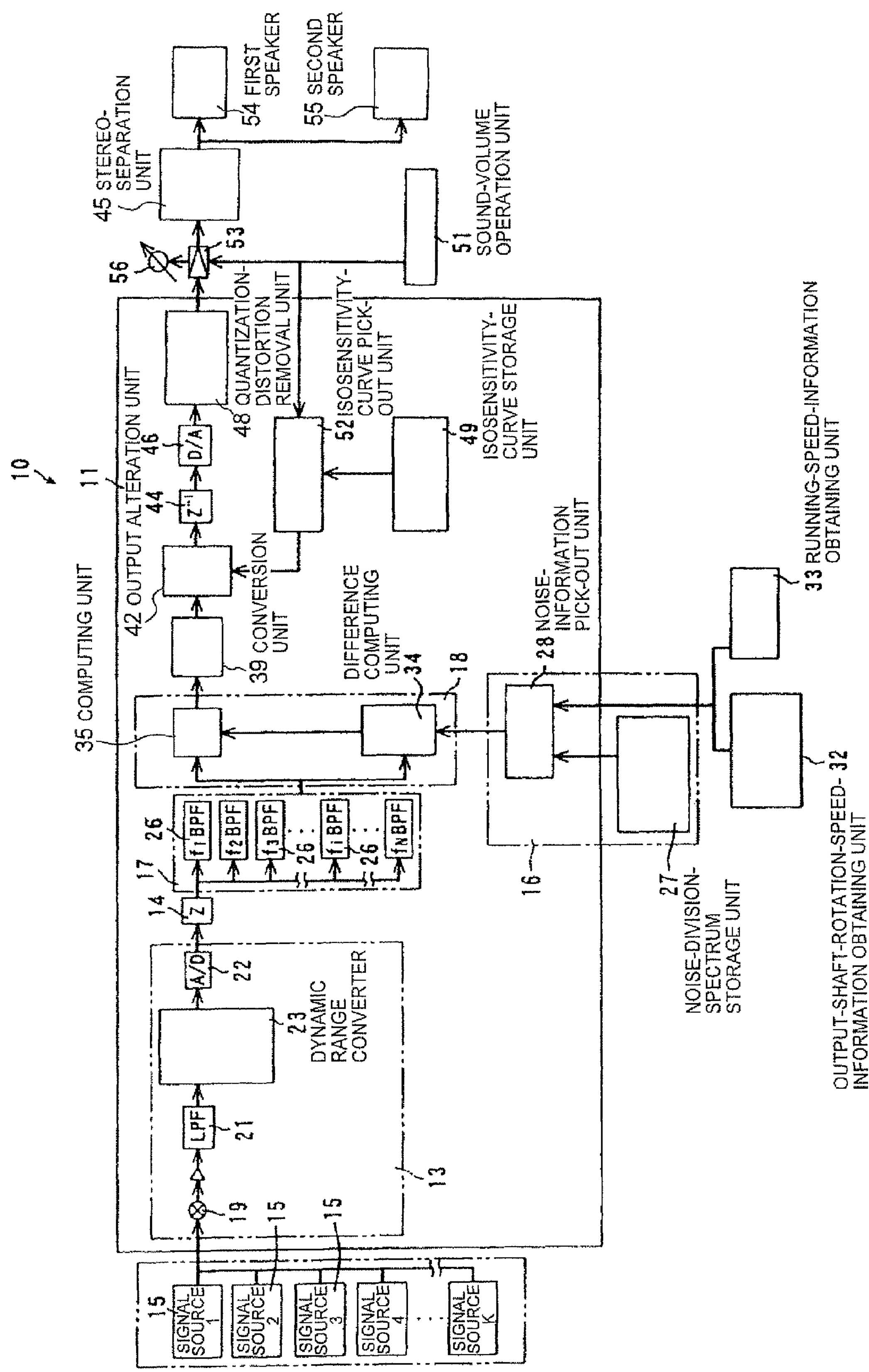
FIG. 1 is a block diagram illustrating the construction of the sound device 10 according to a first embodiment of the present invention.

Hereinafter, several embodiments of the present invention will be described with reference to the drawings. In the description provided below, like parts described in one previous embodiment (or embodiments) are respectively designated by like reference numerals in another embodiment (or other embodiments) following the previous embodiment, and repeated descriptions on such parts will be omitted as needed. For instance, even though the construction, which is wholly shown and described in the previous embodiment, is shown and described for only a part thereof in another embodiment following the previous embodiment, it should be understood that each of the other parts not shown and described in such a following embodiment has substantially the same construction as the construction of the same or like part that have been already shown and described. Further, it should be construed that the description on the exemplary embodiments of this invention is intended to imply any proper combination of suitable parts specifically described in such embodiments, as well as to imply any suitable combination of these embodiments, provided that such combination of the embodiments will never have any negative impact on the resultant system. Therefore, it should be appreciated that the following description on the sound device 10 and sound control device 11 is provided by way of example only.

First Embodiment

Figure 2:
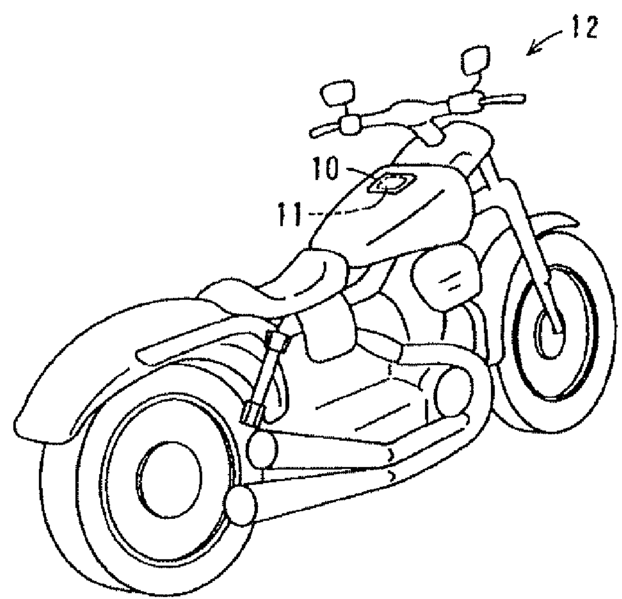
FIG. 2 is a perspective view of a motorcycle 12 on which the sound device 10 according to the first embodiment of this invention is mounted.

FIG. 1 is the block diagram illustrating the construction of the sound device 10 related to the first embodiment, and FIG. 2 is the perspective view of the motorcycle 12 on which the sound device 10 according to the first embodiment of this invention is mounted. The sound device 10 is intended for correcting the sound signal in order to eliminate undesired influence of the noise on the audio sound. It is noted that the term "audio sound" (including the expression of "audio-") is used herein as the sound that is outputted to be heard or listened by the user of the sound device 10. Meanwhile, the term "noise" is used herein as the sound that is generated naturally without any purpose to be listened, such as the sound generated by the internal combustion engine of the motorcycle 12 or the like. As shown in FIGS. 1 and 2, the sound control device 11 according to the first embodiment is included in the sound device 10 also according to the first embodiment, and serves to obtain the sound spectrum information of the audio information inputted thereto, and then correct the sound-volume information for each critical frequency band width of the audio information, based on the sound-volume information for each critical frequency band width of the noise.

The sound device 10 includes the audio-information output unit 13, analysis unit 14, noise-division-spectrum output unit 16, audio-division-spectrum output unit 17 and correction unit 18. In this case, the audio-information output unit 13, analysis unit 14, noise-division-spectrum output unit 16, audio-division-spectrum output unit 17 and correction unit 18 are all mounted on the motorcycle 12.

The audio-information output unit 13 serves to output the audio information, and includes signal sources 15. For instance, each signal source 15 may be a radio tuner adapted for receiving a radio wave signal and then demodulating and outputting the signal, or may be a cassette tape player adapted for picking out and outputting a necessary signal stored in a magnetic recording tape, or otherwise may be a CD player adapted for picking out and outputting the signal stored in a compact disk (or CD) or MD player adapted for picking out and outputting the signal stored in a Mini-Disk (or MD). While a single signal source 15 may be included in the audio-information output unit 13, a plurality of signal sources 15 are provided in the first embodiment. Namely, in the first embodiment, the number of the signal sources 15 is determined in advance, and is set at a proper value, e.g., K, as shown in FIG. 1. Of course, this number K is a predetermined natural number. Each signal source 15 can serve to output each corresponding signal to the audio-information output unit 13.

The audio-information output unit 13 further includes a signal-source selection means 19, an LPF filter (or return-prevention filter) 21, and an A/D converter 22. In this configuration, the signal outputted from each signal source 15 is first inputted into the signal-source selection means 19. Then, the signal-source selection means 19 selects any one or several ones of the signal sources 15. The operation of the signal-source selection means 19 is carried out by the user. After selecting the signal source or sources 15 while being operated by the user, the signal-source selection means 19 outputs the signal inputted from each selected signal source 15 to the LPF filter 21. This LPF filter 21 can serve to remove each audio signal of the frequency higher than a half frequency relative to a sampling frequency for the digital conversion before the audio signal is subjected to the digital conversion by the A/D converter 22.

In some cases, once the audio signal has been subjected to the digital conversion, each digitized signal of the frequency higher than the half frequency relative to the sampling frequency cannot be discriminated from each digitized signal of the frequency lower than the half frequency relative to the sampling frequency. Therefore, the provision of the LPF filter 21 on the upstream side in the signal transmission direction relative to a point at which the digital conversion is performed can successfully prevent each signal having such a high frequency that cannot be subjected to the analog conversion that will be performed following the digital conversion from being included in the resultant digitized signals. This LPF filter 21 can be achieved by using a proper low-pass filter. Then, each signal passed through such an LPF filter 21 will be inputted to a dynamic range converter 23.

The dynamic range converter 23 is included in the audio-information output unit 13 and adapted for changing a range of the voltage of each signal inputted thereto into a preset voltage range. At any point or section in the sound device 10 through which the sound-volume information is transmitted as an analog signal, each signal indicative of such sound-volume information is transmitted as an electric signal. Thus, with increase of the sound volume indicated by the sound-volume information, the signal indicative of the sound-volume information is set as the electric signal of a larger voltage. In this case, the sound volume that can be handled or processed by the sound device 10 is determined in advance, and hence the voltage that can be used or allowed in the sound device 10 is also set in advance. Therefore, the range of the voltage of each audio signal has to be set within a suitable preset range, when the signal is inputted to the A/D converter 22 after the signal is outputted from the corresponding signal source 15 and passed through the LPF filter 21.

Namely, the dynamic range converter 23 can serve to detect changes of the voltage of each signal inputted thereto, and change the maximum voltage and minimum voltage of the range of the detected voltage change into those voltages of the preset voltage range and then output the so-changed voltage information. Further, each signal voltage within the range of the voltage change is converted, with the same amplification factor, into a voltage value within the preset range. Namely, this amplification factor is set as a value obtained by dividing each voltage value within the preset range by the corresponding voltage value inputted to the dynamic range converter 23. In this case, this amplification factor is a real number, including the real number exceeding 1 or positive real number equal to or less than 1. Thus, when the sound device 10 is operated with the amplification factor already set in the dynamic range convertor 23, and if the voltage value obtained by multiplying the voltage inputted to the dynamic range converter 23 by the amplification factor exceeds the preset range, such a preset amplification factor is replaced by a smaller value, so as to set a new amplification factor. Thereafter, the signal outputted from the dynamic range converter 23 will be inputted to the A/D converter 22.

The A/D converter 22 can serve to convert or change the audio signal outputted from each signal source 15 into the corresponding digital signal. In the first embodiment, the A/D converter 22 is provided as an analog-digital converter adapted for converting the analog signal into the digital signal. Therefore, in the case in which the digital signal can be directly transmitted and processed through the device, like the signal outputted from each certain signal source 15, e.g., the CD player, MD player or the like, that can directly output the audio signal as the digital signal without once changing the analog signal into the digital form, this A/D converter may be eliminated, or otherwise a proper D/D converter may be provided to the device. In either case, each signal outputted from the A/D converter 22 is inputted, as the signal outputted from the audio-signal output unit, into the analysis unit 14.

Figure 3:
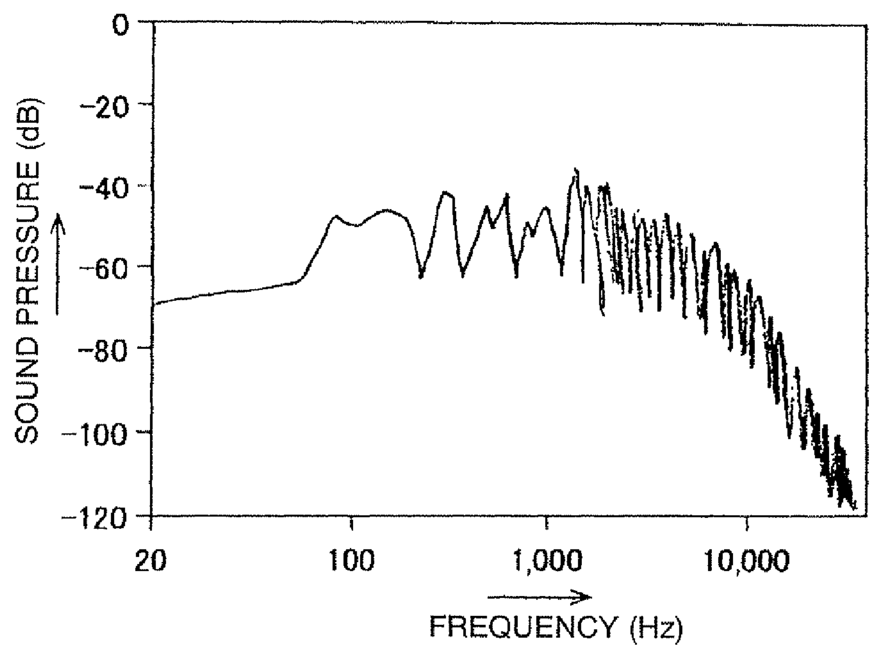
FIG. 3 is a diagram illustrating the sound spectrum of the audio information outputted from the audio-information output unit 13 in the first embodiment of this invention.

FIG. 3 is the diagram illustrating the sound spectrum of the audio information outputted from the audio-information output unit 13 in the first embodiment of this invention. In this drawing, the horizontal axis designates the frequency in units of Hz (or hertz), while the vertical axis designates the sound pressure in units of dB (or decibel). Further, the horizontal axis is expressed by a logarithmic scale, while the vertical axis is graduated with an equal interval of the units or decibels. In this embodiment, the unit of dB is defined based on $2\times10^5$ pascals (Pa) as the absolute standard value thereof.

FIG. 3 shows the sound spectrum obtained, by way of example, on the basis of the audio sound in the first movement of the Beethoven's Fifth Symphony. In this case, the analysis unit 14 receives the audio information outputted from the audio-information output unit 13, and then outputs the sound spectrum information of the audio information inputted thereto. The sound pressure of the sound of each frequency included in the audio sound will be referred to as the "sound spectrum" expressed in units of the frequency, while the information expressed by the sound spectrum will be referred to as the "sound spectrum information". Specifically, the analysis unit 14 analyzes the audio information outputted from the audio-information output unit 13 for each corresponding frequency, so as to obtain and output the sound spectrum information.

More specifically, the analysis unit 14 may have a function for subjecting the audio information to a Fourier transformation. However, in the first embodiment, the analysis unit 14 is adapted for subjecting the audio information to a Z-transformation. The Fourier transformation is suitable for decomposing a general wave function into frequency components thereof. Meanwhile, the Z-transformation is suitable for decomposing the wave function including a complex number, as a variable, into the frequency components thereof. Namely, the Z-transformation is suitable for the analysis in the case in which the wave function is expressed as an exponential function including the complex number. Further, as compared with the Fourier transformation, the Z-transformation can more facilitate individual analysis for the phase and frequency, respectively included in each wave.

Then, the sound spectrum information outputted from the analysis unit 14 is inputted to the audio-division-spectrum output unit 17. This audio-division-spectrum output unit 17 can serve to receive the sound spectrum information of the audio information, and then output the audio-division-spectrum information. As used herein, the term "audio-division-spectrum information" means the information for each critical band width of the sound spectrum information of the audio information. This audio-division-spectrum information includes the sound-volume information concerning the sound volume for each critical band width and the information on the tone. In this embodiment, the sound device 10 can be operated over the frequency band within a range of from 0 Hz to 20 kHz, while, in another embodiment, this device may be operated over the frequency band of a narrower range, such as the range of from 0 Hz to 10 kHz. This is because the audible range of the human is approximately within the range of from 0 Hz to 20 kHz, and particularly the frequency band that can be readily caught for the audible sense of the human and thus frequently used as the audio sound or music is within the range of from 0 Hz to 10 kHz.

As used herein, the term "critical band width" means the minimum frequency band of the noise that can have some influence or impact on the audio sound for the auditory sense of the human. Namely, when the human catches the audio sound of a certain frequency, the noise that is within the critical band width centered on the frequency of this audio sound has greater influence on the audio sound, as compared with the noise out of this critical band width, thus well masking the audio sound. Therefore, because of such masking onto the audio sound with the noise having the frequency in the critical band width, the minimum audible limit for the audio sound has to be raised. Namely, unless the sound volume of such a masked audio sound is increased greater than the sound volume before this audio sound is masked, this masked audio sound could not be caught by the human as the sound of apparently the same sound volume under the noise. Generally, the critical band width corresponds to a 0.9 mm length in the longitudinal direction of the internal ear of the human on the basal membrane thereof having a 35 to 36 mm length.

Figure 4:
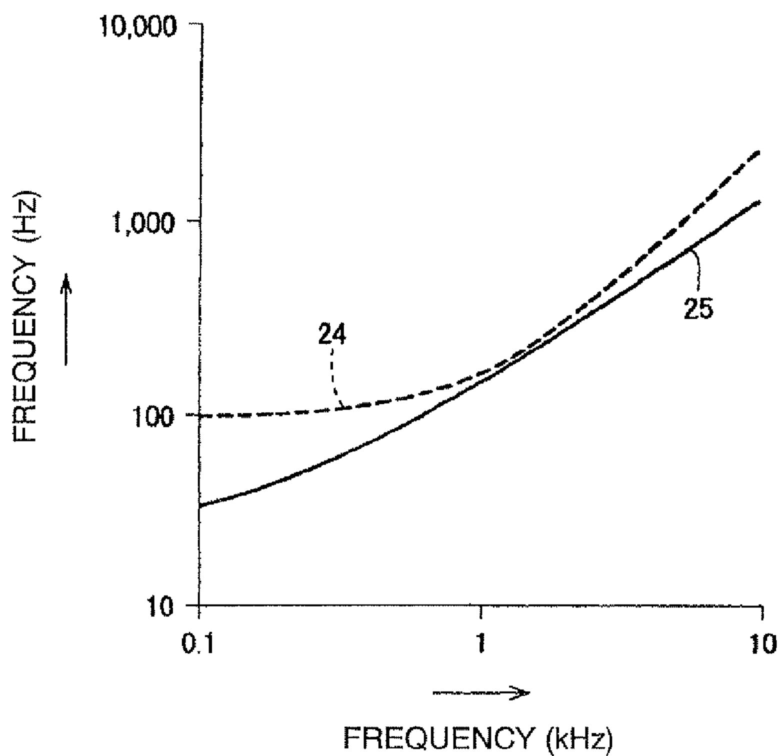
FIG. 4 is a diagram illustrating frequency dependency of the critical band width reported by Zwicker and Terhardt and another frequency dependency of the critical band width reported by Greenwood.

FIG. 4 is the diagram illustrating the frequency dependency of the critical band width reported by Zwicker and Terhardt and another frequency dependency of the critical band width reported by Greenwood. In FIG. 4, the vertical and horizontal axes designate the frequency in units of Hz and kHz, and are expressed by the logarithmic scale, respectively. As shown in this drawing, the critical band width depends on a central frequency thereof. Thus, in 1980, Zwicker and Terhardt have reported such frequency dependency of the critical band width as expressed by the following function.

$$CB(\mathrm{Hz})=25+75\{1+1.4(f(\mathrm{kHz}))^2\}^{0.69} \quad (1)$$

In this expression, CB(Hz) designates the critical band width, and f(kHz) denotes the central frequency of the critical band width. Meanwhile, Greenwood has reported such frequency dependency of the critical band width as expressed by the following function.

$$CB(\mathrm{Hz})=0.9aA\cdot(f(\mathrm{Hz})/A+1)\cdot\ln(10) \quad (2)$$

Similarly, in this function, CB(Hz) expresses the critical band width, f(Hz) denotes the central frequency of the critical band width, and a and A are certain constants, respectively. Generally, for the human, a is 0.06 and A is 165.4. FIG. 4 illustrates a first curve 24 denoting the above function (1), and a second curve 25 denoting the function (2).

In the case of setting a plurality of critical band widths, for example, one critical band width centered on 1000 Hz is first set. In this case, assuming that, in either of the above function (1) or (2), the critical band width corresponding to the 1000 Hz frequency is expressed by d(Hz), such a critical band width including the 1000 Hz frequency has a d/2(Hz) width on each of the higher and lower frequency sides relative to the central 1000 Hz frequency. Thus, this critical band width can be set as a frequency range equal to or narrower than the range of from (1000−d/2(Hz)) to (1000+d/2(Hz)).

Next, another critical band width adjacent, on the higher frequency side, relative to the above critical band width having the frequency band width of d(Hz) and still another critical band width adjacent, on the lower frequency side, to the same critical band width of d(Hz) are newly set, respectively. Similarly, two critical band widths, respectively adjacent, on each of the higher and lower frequency sides, relative to each of such newly-set critical band widths, are further set, respectively.

More specifically, one exemplary approach for setting each critical band width includes: a first step of setting one critical band width centered on a predetermined frequency; a second step of setting another critical band width having the frequency band adjacent on the higher frequency side and corresponding to the critical band width set in the first step, as well as setting still another critical band width having the frequency band adjacent on the lower frequency side and corresponding to the critical band width set in the first step; a third step of setting still another critical band width having the frequency band adjacent on the further higher frequency side and corresponding to the critical band width set on the higher frequency side in the second step, as well as setting still another critical band width having the frequency band adjacent on the further lower frequency side and corresponding to the critical band width set on the lower frequency side in the second step; and a fourth step of repeating the same procedure as that performed in the third step, for setting two critical band widths, respectively adjacent, on each of the still further higher and lower frequency sides, relative to each of the two critical band widths respectively set in each step performed just before.

In this method including the aforementioned first to fourth steps for setting each critical band width, the critical band width may be set, based on either of the above function (1) or (2). In other words, each critical band width set by this method can satisfy either of the above function (1) or (2), with respect to the central frequency thereof.

By the way, it is generally known that each critical band width can be approximated by a one-third (⅓) octave with respect to the central frequency thereof. Further, when the frequency is increased or raised twice, the pitch of the sound is raised by one octave. For example, when the frequency of a certain original sound is multiplied by the twelfth root of 2, i.e., approximately 1.059463, the pitch of the sound of the resultant multiplied frequency will be raised by a half semitone relative to the original sound. Alternatively, when the frequency of another original sound is multiplied by the cube root of 2, i.e., approximately 1.26, the pitch of the sound of the resultant multiplied frequency will be raised by the one-third octave relative to the original sound. Thus, the critical band width may be determined or set by utilizing such an approach (i.e., a ⅓-octave approximation method).

In this method of determining the critical band width, a proper geometric series, with the cube root of 2 used as the common ratio thereof, is first prepared on the basis of 1000 Hz, and then each term of the so-prepared geometric series is used as a value of the central frequency of each critical band width. Further, each frequency band within a range higher or greater than a frequency value obtained by dividing each central frequency by the square root of 1.26, i.e., approximately 1.12246, as well as lower or smaller than another frequency value obtained by multiplying the central frequency by the square root of 1.26, is determined as the critical band width corresponding to the central frequency. Namely, in this invention, although each critical band width may be set based on either of the above function (1) or (2), the critical band width is set in the first embodiment by employing the method of approximating each critical band width by the one-third (⅓) octave. Further, in this embodiment, forty (40) critical band widths are set in the frequency band of from 0 Hz to 20 kHz. FIG. 1 shows one exemplary case in which the number of the critical band widths is N, and in which this N is a preset natural number.

The audio-division-spectrum output unit 17 includes a plurality of band-pass filters 26. These band-pass filters 26 can respectively serve to divide the sound spectrum information inputted to the audio-division-spectrum output unit 17 into each corresponding critical band width. After the sound spectrum information is divided by the band-pass filters 26, the audio-division-spectrum output unit 17 outputs the sound-volume information for each frequency included in each corresponding critical band width, as the sound-volume information averaged over the critical band width. In each critical band width, while the sound-volume is averaged, the frequencies included in this critical band width are not processed collectively. Accordingly, in the audio-division-spectrum information wherein the information on the tone is maintained, the phases of the sound waves of the respective frequencies are not processed collectively in each critical band width. Instead, each phase is processed in a state correlated with each corresponding frequency.

In this embodiment, the sound-volume information included in the sound-spectrum information is divided into each corresponding critical band width, wherein one set of the sound-volume information obtained by averaging the sound-volume information included in each critical band with respect to the frequency will be referred to as the "division-spectrum information". When the division-spectrum information is based on the audio sound, this division-spectrum information also includes the information on the tone. In short, the audio-division-spectrum output unit 17 can serve to convert or change the sound-spectrum information inputted thereto into the division-spectrum information, and then output this division-spectrum information to the correction unit 18.

Figure 5:
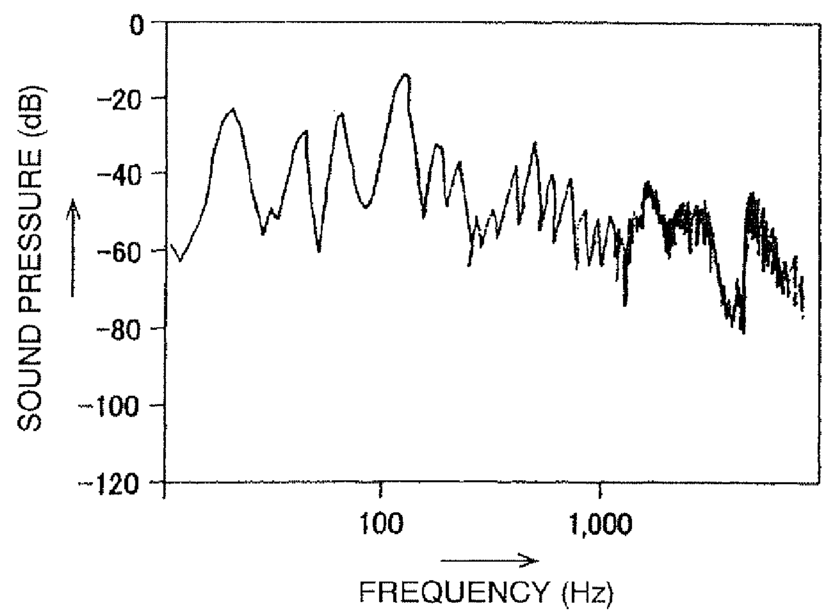
FIG. 5 is a diagram illustrating the sound spectrum of the noise in the first embodiment of this invention.

FIG. 5 shows the sound spectrum of the noise in the first embodiment of this invention. Namely, FIG. 5 is the diagram showing the sound spectrum of the noise generated when the motorcycle 12 of a 1600 cc (cubic centimeters) displacement is running. In FIG. 5, the horizontal axis designates the frequency in the units of Hz, while the vertical axis designates the sound pressure in the units of dB. Further, the horizontal axis is expressed by the logarithmic scale, while the vertical axis is graduated with an equal interval of the units or decibels.

Obviously, the frequency band designated by the horizontal axis shown in FIG. 5 is different from the frequency band shown in FIG. 3. Of course, the noise generated by the motorcycle 12 varies with the running speed of the motorcycle 12 as well as with the rotation speed of the engine (or engine speed) thereof. For instance, with the change of the running speed of the motorcycle 12, the relative speed between the motorcycle 12 and the surrounding air is changed, thus generating the sound of a wind. In addition, with the change of the rotation speed of each tire of the motorcycle 12 relative to the road surface, the tire will be partly in contact with, or otherwise detached from, the road surface, thus generating the noise. Furthermore, with the change of the engine speed, the noise generated from the engine will be changed.

This noise can be analyzed for the frequency and thus expressed as the sound spectrum indicative of the sound volume for each frequency of the noise. In this case, the division-spectrum information on the noise obtained by dividing the sound spectrum information on the noise into each critical band width that is set by either one of the aforementioned methods for setting the critical band width will be referred to as the “noise-division-spectrum information”.

The noise-division-spectrum output unit 16 serves to output the noise-division-spectrum information indicative of the sound-volume information for each critical band width of the noise. This noise-division-spectrum output unit 16 includes a noise-division-spectrum storage unit 27 and a noise-information pick-out unit 28. The noise-division-spectrum storage unit 27 serves to store therein the sound-volume information for each critical band width of the noise. The noise-division-spectrum information stored in the noise-division-spectrum storage unit 27 can be experimentally obtained and then stored and prepared in the storage unit 27 in advance for each operation. The noise-information pick-out unit 28 serves to obtain the sound-volume information for each critical band width of the noise associated with or related to the environment from the noise-division-spectrum storage unit 27, and then output the so-obtained noise-division-spectrum information. In this case, the frequency of each critical band width of the audio-division-spectrum information outputted from the sound-division-spectrum output unit is matched with the frequency of each corresponding critical band width of the noise-division-spectrum information outputted from the noise-division-spectrum output unit 16.

In the noise-division-spectrum storage unit 27, various kinds of noise-division-spectrum information on the noise of the motorcycle 12 are stored. Namely, the noise-division-spectrum information stored in the noise-division-spectrum storage unit 27 includes various patterns of the noise-division-spectrum information, wherein each pattern is based on the noise generated due to the change of the running speed of the motorcycle 12 as well as due to the change of the engine speed. The engine speed has a one-to-one relationship with the rotation speed of the output shaft of the internal combustion engine equipped for the motorcycle 12, i.e., the rotation speed of the crank shaft of the engine.

The noise-information pick-out unit 28 can serve to obtain the sound-volume information for each critical band width of the noise related to the running speed of the motorcycle 12 from the noise-division-spectrum storage unit 27, and then output the so-obtained noise-division-spectrum information. More specifically, the noise-information pick-out 28 can select and obtain the sound-volume information for each critical band width of the noise related to the rotation speed of the output shaft of the internal combustion engine driving the motorcycle 12 from the noise-division-spectrum storage unit 27, and then output the so-obtained sound-volume information.

An output-shaft-rotation-speed-information obtaining unit 32 is electrically connected with the noise-information pick-out unit 28, such that the information detected by the output-shaft-rotation-speed-information obtaining unit 32 can be outputted to the noise-information pick-out unit 28. This output-shaft-rotation-speed-information obtaining unit 32 can serve to measure the rotation speed of the crank shaft of the engine of the motorcycle 12. More specifically, the output-shaft-rotation-speed-information obtaining unit 32 is a tachometer. Namely, with the provision of this tachometer, the noise-information pick-out unit 28 can select the noise-division-spectrum information corresponding to the rotation speed of the engine among the plurality of noise-division-spectrum information stored in the noise-division-spectrum storage unit 27.

Further, a running-speed-information obtaining unit 33 is electrically connected with the noise-information pick-out unit 28, such that the information detected by the running-speed-information obtaining unit 33 can be outputted to the noise-information pick-out unit 28. This running-speed-information obtaining unit 33 can serve to measure the running speed of the motorcycle 12. More specifically, the running-speed-information obtaining unit 33 is a speedometer. Namely, with the provision of this speedometer, the noise-information pick-out unit 28 can select and obtain the noise-division-spectrum information corresponding to the running speed of the motorcycle 12 among the plurality of noise-division-spectrum information stored in the noise-division-spectrum storage unit 27.

Then, the noise-information pick-out unit 28 outputs the obtained noise-division-spectrum information to the correction unit 18. In this embodiment, the engine speed (or rotation speed of the engine) and running speed of the motorcycle 12 are collectively referred to as the “environment”. The correction unit 18 serves to correct the audio-division-spectrum information based on the noise-division-spectrum information, and then output the correction-division-spectrum information expressing the so-corrected audio-division-spectrum information. This correction unit 18 includes a difference computing unit 34 and a computing unit 35.

Figure 6:
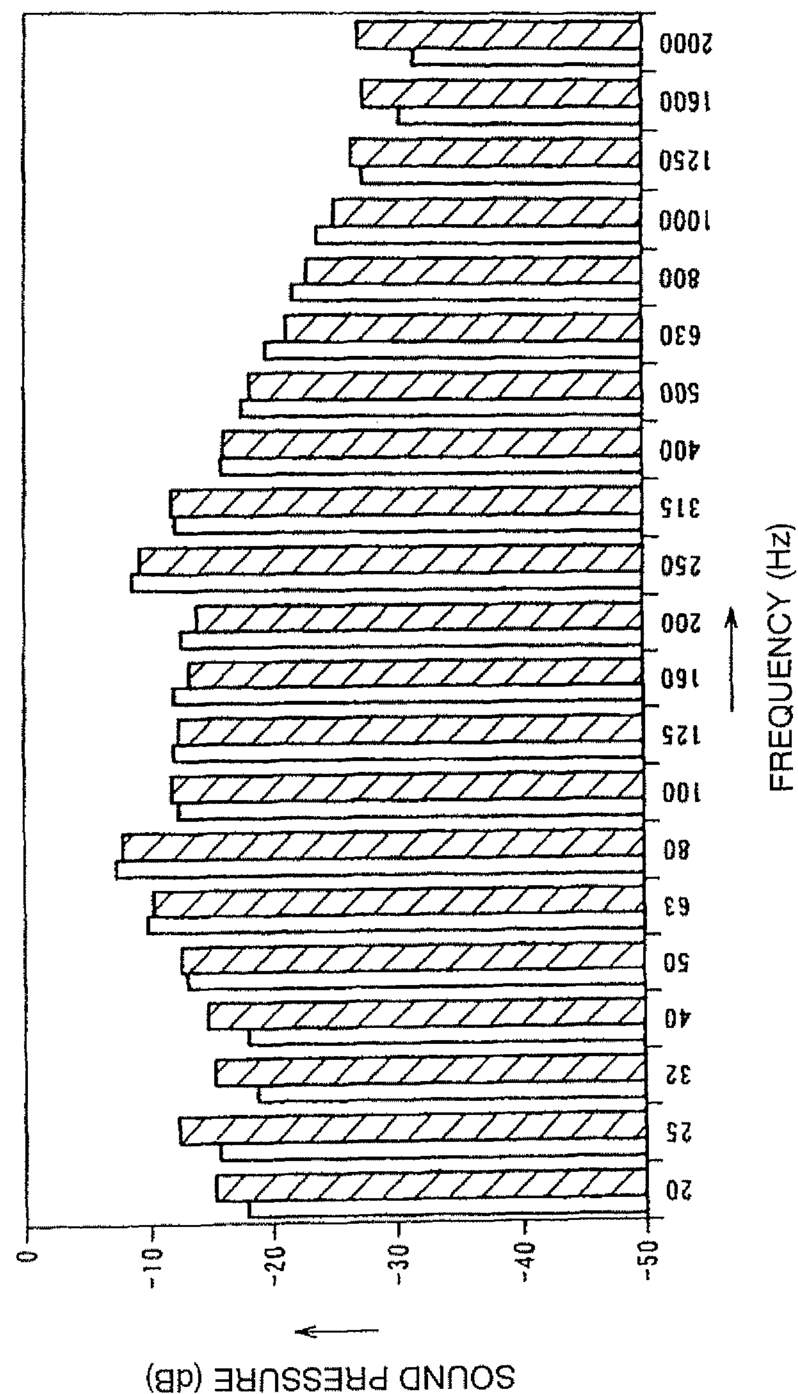
FIG. 6 is a diagram illustrating division spectra, each spectrum being indicative of a difference between the audio-division-spectrum information and the noise-division-spectrum information in the first embodiment of this invention.

FIG. 6 is the diagram illustrating the division spectra, each spectrum being indicative of the difference between the audio-division-spectrum information and the noise-division-spectrum information in the first embodiment of this invention. Specifically, FIG. 6 illustrates the division spectra, each indicating the difference between the division-spectrum information obtained from the sound spectrum information of the audio sound shown in FIG. 3 and the division-spectrum information obtained from the sound spectrum information of the noise shown in FIG. 5. Namely, these division spectra are respectively indicative of the information obtained by subtracting the noise-division-spectrum information from the audio-division-spectrum information. In FIG. 6, the horizontal axis designates the frequency in the units of Hz, while the vertical axis designates the sound pressure in the units of dB. Further, in FIG. 6, each critical band width is set by the aforementioned ⅓-octave approximation method. Additionally, in FIG. 6, each division spectrum is measured twice, and the so-obtained two measurement results are respectively expressed by slightly shifted two columns or bars.

Figure 7:
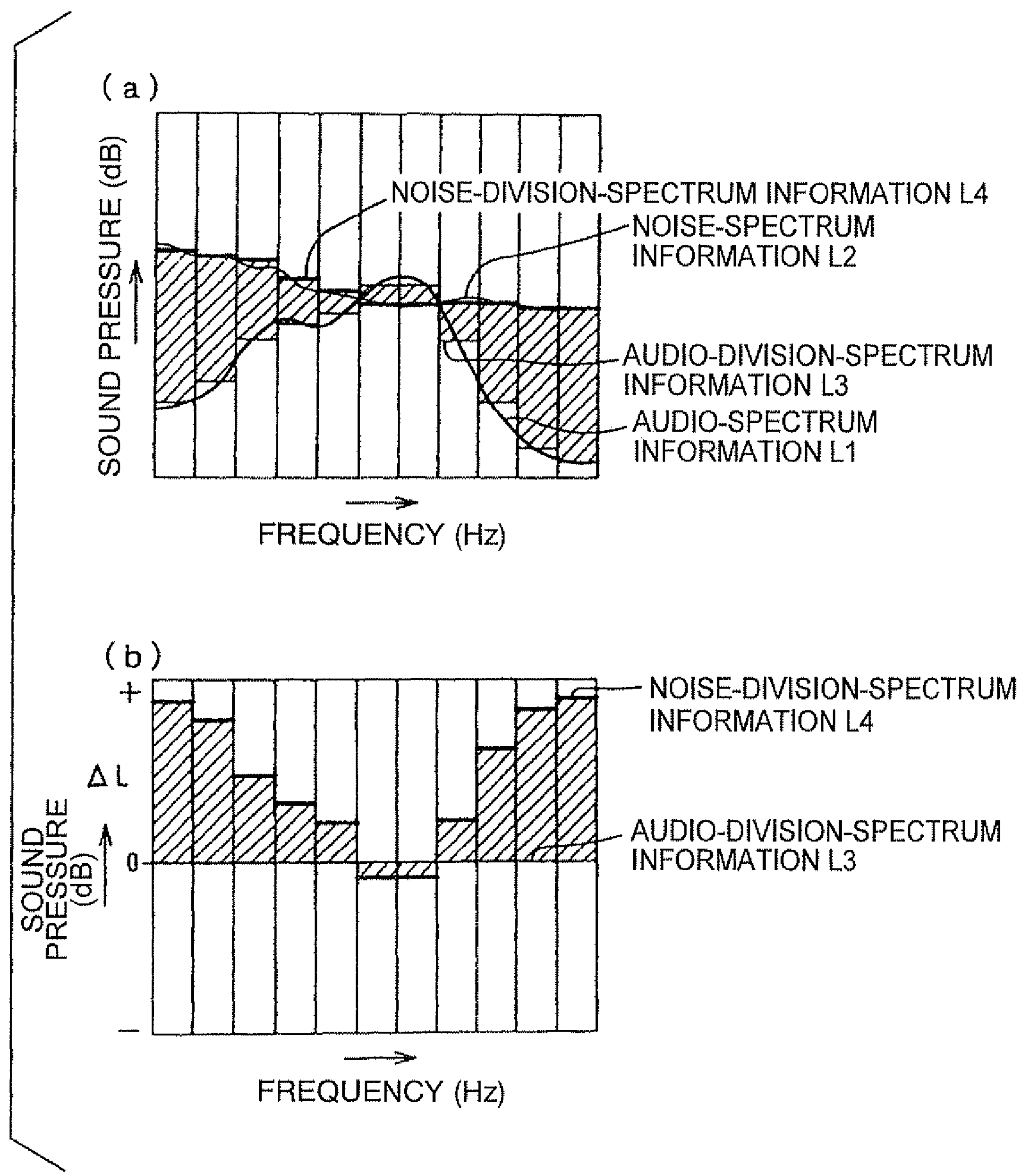
FIG. 7 is a diagram for illustrating a function of the correction unit 18 in the first embodiment of this invention.

FIG. 7 is the diagram for illustrating the function of the correction unit 18 in the first embodiment of this invention. FIG. 7(*a*) illustrates the audio-spectrum information L1, noise-spectrum information L2, audio-division-spectrum information L3 and noise-division-spectrum information L4. FIG. 7(*b*) shows the result obtained by subtracting the audio-division-spectrum information L3 from the noise-division-spectrum information L4. In FIG. 7, the horizontal axis designates the frequency (Hz), while the vertical axis designates the sound pressure (dB). In this case, each sound spectrum of the audio information expressed by the curve L1 shown in FIG. 7(*a*) is calculated as the audio-division-spectrum information L3 for each corresponding critical band width. Then, the so-obtained audio-division-spectrum information L3 is compared with the noise-division-spectrum information L4 shown in FIG. 7(*a*), in order to obtain the difference ΔL (=L4−L3). This difference ΔL is calculated by the difference computing unit 34. Namely, FIG. 7(*b*) shows the difference information calculated by the difference computing unit 34.

Specifically, the sound-volume information for each critical band width included in the audio-division-spectrum information L3 is subtracted from the sound-volume information for each corresponding critical band width included in the noise-division-spectrum information L4. Thereafter, the difference information ΔL calculated by the difference computing unit 34 will be outputted from the difference computing unit 34 to the computing unit 35.

More specifically, the difference computing unit 34 can serve to subtract the audio-division-spectrum information L3 from the noise-division-spectrum information L4. As a result, in the frequency band where the sound volume of the noise is greater than the sound volume of the audio sound, the difference ΔL will be a positive value. Meanwhile, in the frequency band where the sound volume of the noise is smaller than the sound volume of the audio sound, the difference ΔL will be a negative value. For such difference information ΔL, the frequency band where the sound volume of the noise is greater than the sound volume of the audio sound will be referred to as the "first band", while the frequency band where the sound volume of the audio sound is greater than the sound volume of the noise will be referred to as the "second band". Under the condition for measuring each spectrum shown in FIG. 6, all of the frequency bands are the first band.

Then, the computing unit 35 receives the audio-division-spectrum information L3, difference information ΔL and noise-division-spectrum information L4. Thereafter, the computing unit 35 adds the difference information ΔL to the audio-division-spectrum information L3 for each first band, while subtracting the difference information ΔL from the noise-division-spectrum information L4 for each second band.

The sound volume masked in each second band where the sound volume of the audio sound is greater than the sound volume of the noise is equal to the sound volume of the noise. Meanwhile, in each first band where the sound volume of the noise is greater than the sound volume of the audio sound, the sound volume that can be heard or listened as a remaining audio sound, after the sound volume of the audio sound is masked by the noise, is equal to the sound volume of the audio sound. Hereinafter, the information indicative of the lowest limit of the sound volume that is necessary to be recognized even under the noise will be referred to as the "mask-sound-volume information".

Thereafter, the computing unit 35 adds the division-spectrum information of the audio sound corresponding to the sound volume indicated by the mask-sound-volume information to the audio-division-spectrum information L3 in the same phase and then outputs the resultant information as the correction-division-spectrum information. In this case, the sound volume indicated by the mask-sound-volume information in each critical band is equal to the sound volume of the audio sound masked by the noise. Namely, with the above addition, the audio sound is increased by the sound volume of the audio sound masked by the noise.

In this embodiment, when the sound volume indicated by the mask-sound-volume information exceeds 15 dB, the computing unit 35 adds the division-spectrum information of the audio sound corresponding to the sound volume of 15 dB to the audio-division-spectrum information L3. Namely, when the correction unit 18 corrects the audio sound masked by the noise for each critical band width after it has analyzed this audio sound over the frequency, if the sound volume to be added for the correction exceeds 15 dB, the proportion between a part of the audio sound increased by such correction and another part of the audio sound of the frequency band that has not been masked by the noise would be unduly changed, thus causing the uncomfortable feeling to the auditory sense of the human. Therefore, such a limitation to 15 dB or less of the sound volume to be added upon the correction can effectively prevent the audio sound outputted from the sound device 10 from presenting the uncomfortable feeling to the auditory sense of the human.

Hereinafter, the audio-division-spectrum information obtained by correcting the audio-division-spectrum information L3 based on the noise-division-spectrum information L4 will be referred to as the "correction-division-spectrum information". In this embodiment, the correction-division-spectrum information corresponds to the division-spectrum information obtained by adding the division-spectrum information of the audio sound concerning the sound volume indicated by the mask-sound-volume information to the audio-division-spectrum information. By the way, in this embodiment, the term "noise" means a steadily continued noise of the sound spectrum exhibiting a similar form continued for one or more seconds, or sometimes for several or more seconds. Thus, the computing unit 35 is provided for correcting the audio sound corresponding to such a steadily continued noise.

The tone depends on the wave form of the sound that is expressed, for example, in a graph including the vertical axis designating the sound pressure and the horizontal axis designating the time. Of course, the tone of the audio sound, such as the sound of some music, a human voice, a musical instrument or the like, is apparently different from the tone of the noise generated with mechanical operation of the motorcycle 12. This is because the frequency dependency is markedly different between such two tones, as well as because the wave form of the sound, when expressed in the graph having the horizontal axis designating the time, is clearly different therebetween. Accordingly, by adding the division-spectrum information of the audio sound of the same phase to the audio-division-spectrum information, the audio sound masked by the noise can be adequately corrected.

In this way, the step, in which the analysis unit 14 analyzes the audio information outputted from the audio-information output unit 13, and the output unit 17 outputs the audio-division-spectrum information L3 based on the analyzed audio information, and then the correction unit 18 corrects the audio-division-spectrum information L3 based on the audio-division-spectrum information L3 and noise-division-spectrum information L4, will be repeated with a predetermined period of time. For instance, it is preferred that this period of time during which the above step is repeated is approximately $1/16000$ to $1/32000$ second. Further, this period can allow the wave form of 2 kHz of the sound to be divided into 8 to 16 equal sections with respect to the time.

The sound control device 11 includes the noise-information pick-out unit 28, analysis unit 14, audio-division-spectrum output unit 17 and correction unit 18. In the sound control device 11 of this embodiment, these components are integrated together. More specifically, such components are provided integrally in a packaged form on one substrate. Further, in the sound control device 11 of this embodiment, a conversion unit 39, an output alteration unit 42, an analysis return unit 44, a D/A converter 46 and a quantization-distortion removal unit 48 are integrated together. It is noted that such components will be detailed later.

Namely, the sound device 10 further includes the conversion unit 39. This conversion unit 39 can serve to receive the correction-division-spectrum information, and change this information into the sound-volume information smaller than a preset sound volume, and then output the so-changed information. In some cases, the sound volume indicated by the correction-division-spectrum information exceeds the sound volume that can be handled or processed by the sound device 10. Therefore, the conversion unit 39 is provided for converting such correction-division-spectrum information into the information that can be within a preset range of the sound volume. Further, in some cases, the audio sound is listened to be rather strange for the auditory sense of the human due to excessive amplification to the sound volume of the audio sound in the frequency band masked by the noise. Also in this case, the conversion unit 39 can appropriately change or limit the sound volume indicated by the correction-division-spectrum information, thereby successfully preventing the audio sound outputted from the sound device 10 from presenting so strange feeling to the auditory sense of the human.

In the first embodiment, the conversion unit 39 can change the sound-volume information on the sound volume exceeding the preset sound volume, among the results of the above computation, into the sound-volume information corresponding to the preset sound volume. In another embodiment, the sound volume indicated by the correction-division-spectrum information may have a linear relationship with a certain proportionality constant, relative to the sound volume indicated by the division-spectrum information after corrected by the conversion unit. However, in the first embodiment, for each critical band of the correction-division-spectrum information, the sound-volume information indicative of the sound volume exceeding the preset sound volume is changed into the sound-volume information indicative of the preset sound volume, thus preventing the audio sound exceeding a certain preset upper-limit sound volume from being outputted or generated from the sound device 10.

The sound device 10 further includes the output alteration unit 42. This output alteration unit 42 can serve to increase, decrease or maintain the sound-volume information for each critical band width outputted from the correction unit 18 based on an isosensitivity curve of the magnitude of the sound. When the sound of a constant sound volume or constant sound pressure is heard or listened, the magnitude of the sound audible to the human varies with the frequency. In other words, when various kinds of sounds of the same sound pressure are listened, the magnitude of each sound sensed by the human will vary with the frequency. This is because the auditory sense of the human to the sound varies with the frequency.

Specifically, the auditory sense of the human is more sensitive to the sound of approximately 2 kHz to 4 kHz than to the sound of other frequencies. Meanwhile, the auditory sense of the human is less sensitive to the sound of the frequency lower than 100 Hz or exceeding 10 kHz, as compared with the case to the sound of the frequency within the range of 100 Hz to 10 kHz. Therefore, among the sound volumes of the sound of each frequency that can be apparently listened or felt, as the sound of the same sound volume, for the auditory sense of the human, the sound volume within the frequency range of from 2 kHz to 4 kHz is the smallest, while being greater within the range lower than 100 Hz or higher than 10 kHz. Now, a curve depicted in a graph with the vertical axis expressing the sound pressure of the sound of each frequency that is apparently listened or felt, as the sound of the same sound volume, for the auditory sense of the human, and the horizontal axis expressing the frequency, will be referred to as the "isosensitivity curve of the magnitude of the sound". Further, in some cases, this isosensitivity curve of the magnitude of the sound will be merely referred to as the "isosensitivity curve".

Although such isosensitivity curves of the magnitude of the sound generally resemble one another in the shape on the coordinates defined by preset scales respectively designated by both of the horizontal and vertical axes, the difference between each point on the vertical axis of the curve within the frequency range from 2 kHz to 4 kHz and each corresponding point on the vertical axis of the curve within the frequency range of from 100 Hz to 10 kHz will be greater as the sound pressure becomes lower. Similarly, the magnitude of the sound audible to the human will be smaller as the sound pressure becomes lower. Further, each point on the vertical axis of the isosensitivity curve of the magnitude of the sound will be closer to zero (0) as the sound pressure becomes lower. Therefore, in this embodiment, the isosensitivity curve of the magnitude of the sound for each sound pressure is defined on the basis of the sound pressure of 1000 Hz, Namely, this isosensitivity curve is plotted by measuring the sound pressure of each frequency that can be apparently listened or felt as the same sound volume as the sound pressure measured at 1000 Hz.

The output alteration unit 42 receives the correction-division-spectrum information that has been outputted from the correction unit 18 and then passed through the conversion unit 39. This output alteration unit 42 serves to further correct the correction-division-spectrum information based on each isosensitivity curve of the magnitude of the sound. Further, this output alteration unit 42 is electrically connected with the conversion unit 39. In this case, the output alteration unit 42 may correct the correction-division-spectrum information based on one of the plurality of isosensitivity curves of the magnitude of the sound, respectively corresponding to the various sound pressures. For instance, in this embodiment, the output alteration unit 42 first selects one isosensitivity curve of the magnitude of the sound among the plurality of isosensitivity curves of the magnitude of the sound, respectively corresponding to the various sound pressures, depending on the sound volume designated by a sound-volume operation unit 51, and then corrects the correction-division-spectrum information based on the so-selected isosensitivity curve.

The sound device 10 further includes an isosensitivity-curve storage unit 49, the sound-volume operation unit 51, and an isosensitivity-curve pick-out unit 52. The isosensitivity-curve storage unit 49 serves to store therein the plurality of isosensitivity curves respectively depending on the sound volumes of each audio sound, while such isosensitivity curves are respectively correlated with the plurality of magnitudes of the audio sound. The sound-volume operation unit 51 can input sound-volume setting information for controlling the sound volume of each audio sound outputted from the sound device 10. The isosensitivity-curve pick-out unit 52 serves to select and obtain the isosensitivity curve of the magnitude of the sound, corresponding to the sound-volume setting information inputted thereto from the sound-volume operation unit 51, from the isosensitivity-curve storage unit 49, and then output the so-obtained isosensitivity curve. Then, the output alteration unit 42 will increase, reduce or maintain the sound-volume information for each critical band width outputted from the conversion unit 39 based on the isosensitivity curve of the magnitude of the sound corresponding to the sound-volume setting information and outputted from the isosensitivity-curve pick-out unit 52.

The output alteration unit 42 is electrically connected with the isosensitivity-curve pick-out unit 52, and receives the isosensitivity curve of the magnitude of the sound outputted from the isosensitivity-curve pick-out unit 52. Further, the sound-volume operation unit 51 and isosensitivity-curve storage unit 49 are electrically connected with the isosensitivity-curve pick-out unit 52, respectively. The sound-volume operation unit 51 is operated by the user of the sound device 10, in order to control the sound volume outputted from the sound device 10. More specifically, this sound-volume operation unit 51 is connected to the isosensitivity-curve pick-out unit 52 as well as to a sound-volume amplifier 53.

The sound-volume amplifier 53 can change the sound volume of the audio information outputted to first and second speakers 54, 55. In this case, the information on the sound volume of the audio sound determined by the operation of the sound-volume operation unit 51 is referred to as the "sound-volume setting information". This sound-volume setting information outputted from the sound-volume operation unit 51 is inputted to the sound-volume amplifier 53, and then the sound-volume amplifier 53 will change the sound volume of the audio information based on the inputted sound-volume setting information. A sound-volume meter 56 is connected with the sound-volume amplifier 53. This sound-volume meter 56 can serve to display thereon at least one of the sound-volume setting information and amplification factor related to the sound-volume amplifier 53. The display of the sound-volume meter 56 can be visually confirmed by the user of the sound device 10.

The sound-volume setting information outputted from the sound-volume operation unit 51 is also inputted to the isosensitivity-curve pick-out unit 52. The plurality of isosensitivity curves of the magnitude of the sound are stored in the isosensitivity-curve storage unit 49, while being respectively corresponding to the plurality of different sound volumes. On the premise that the sound volume of each audio sound outputted from the first and second speakers 54, 55 through the sound-volume amplifier 53 is determined by the output from the sound-volume operation unit 51, the isosensitivity-curve pick-out unit 52 can serve to select the isosensitivity curve of the magnitude of the sound corresponding to the sound volume of each audio sound outputted from the first and second speakers 54, 55, and then pick out the isosensitivity curve from the isosensitivity-curve storage unit 49 and output the information on this curve as isosensitivity-curve information. Thereafter, the isosensitivity-curve information outputted from the isosensitivity-curve pick-out unit 52 is inputted to the output alteration unit 42.

The sound-volume information for each frequency indicated by the information on the isosensitivity curve of the magnitude of the sound inputted to the output alteration unit 42 varies with the frequency. In this embodiment, as described above, the sound pressure measured at 1000 Hz is used as the reference sound pressure of the isosensitivity curve. Thus, in addition to the case of the output alteration unit 42, this sound pressure measured at 1000 Hz is also used as the reference sound pressure of the sound-volume setting information in each of the isosensitivity-curve pick-out unit 52, isosensitivity-curve storage unit 49 and sound-volume operation unit 51.

In the sound device 10, each sound volume indicated by the sound-volume information is processed or handled on the premise that this sound volume is within a predetermined range. This range concerning the sound-volume information will be referred to as the "sound-volume range". This sound-volume range is set for each critical band width. Among the sound volumes respectively indicated by the sound volume information of each sound volume range, the lowest sound volume is set at a zero sound pressure in any critical band width, while the maximum sound volume in each sound-volume range is set at the same value for each critical band width with respect to both of the noise-division-spectrum information and correction-division-spectrum information.

The output alteration unit 42 can alter each sound-volume range of the correction-division-spectrum information outputted from the conversion unit 39. Specifically, this output alteration unit 42 increases each sound-volume range in the frequency band lower than 100 Hz or higher than 10 kHz corresponding to the isosensitivity curve of the magnitude of the sound, while decreases the sound-volume range in the frequency band of from 2 kHz to 4 kHz corresponding to the isosensitivity curve. However, in the critical band width including the 1000 kHz frequency, the sound-volume range is not altered (i.e., this range is maintained). Namely, this operation, in which the sound-volume range is not altered, i.e., this sound-volume range is multiplied by a real number 1, is referred to herein as the "maintaining operation". In short, the output alteration unit 42 can serve to increase, decrease or maintain the sound-volume range for each critical band width. In other words, this output alteration unit 42 can change each proportion between the respective sound volumes in the high-frequency sound range, low-frequency sound range and middle-frequency sound range, in accordance with each corresponding isosensitivity curve of the magnitude of the sound.

In this way, the division-spectrum information inputted, as the correction-division-spectrum information, to the output alteration unit 42 and then altered by the output alteration unit 42 will be outputted to the analysis return unit 44. This analysis return unit 44 can first subject the information inputted thereto from the output alteration unit 42 to a reverse Z-transformation in order to transform the signal in a form for expressing the sound-volume information of each frequency into another signal in a form for presenting the wave form of the audio sound, and then output the so-transformed signal therefrom. For instance, the signal outputted from the analysis return unit 44 may be expressed in the same form as that of a certain signal obtained, such as by subjecting a certain wave of the audio sound, i.e., changes in the sound pressure of this sound, to an appropriate pulse code modulation (PCM).

Thereafter, each signal outputted from the analysis return unit 44 is inputted to the D/A converter 46 adapted for converting the digital signal into the analog signal. In this way, the signal changed into the analog form is then outputted as another signal for expressing the wave of the audio sound by a voltage wave form. Thereafter, the signal outputted from the D/A converter 46 is inputted to the quantization-distortion removal unit 48. This quantization-distortion removal unit 48 can be implemented by the low-pass filter, and serve to remove quantization distortion. Then, the signal outputted from the quantization-distortion removal unit 48 is inputted to the sound-volume amplifier 53, where this signal is amplified into the sound signal of the magnitude of the sound volume required to be outputted from the first and second speakers 54, 55, and is then outputted from the amplifier 53. The amplification factor, when each signal outputted from the D/A converter 46 is amplified by the sound-volume amplifier 53, is determined in accordance with the sound-volume setting information set by the sound-volume operation unit 51. Thereafter, the signal outputted from the sound-volume amplifier 53 is inputted to a stereo-separation unit 45, where this signal is subjected to stereo-separation, and then outputted to the first and second speakers 54, 55.

In the first embodiment, the sound device 10 is provided to include the audio-information output unit 13, analysis unit 14, noise-division-spectrum output unit 16, audio-division-spectrum output unit 17 and correction unit 18. The analysis unit 14 outputs the sound-spectrum information of the audio information outputted from the audio-information output unit 13. This operation enables the audio information to be processed over the frequency. The audio-division-spectrum output unit 17 outputs the audio-division-spectrum information indicative of the sound-volume information for each critical band width of the sound-spectrum information.

The critical band width is the minimum frequency band of the noise that can have some influence on the audio information for the auditory sense of the human. Namely, when the human catches the audio sound of a certain frequency, the noise that is within the critical band width centered on the frequency of this audio sound has greater influence on the audio sound, thus well masking the audio sound, as compared with the noise out of the critical band width. Once masked by the noise within the critical band width, the minimum audible limit for the audio sound should be raised. Namely, unless the sound volume of this audio sound is increased greater than the sound volume before this sound is masked, such an audio sound cannot be caught by the human, as the sound apparently having the same sound volume as that of the audio sound before it is masked.

The noise-division-spectrum output unit 16 outputs the noise-division-spectrum information indicative of the sound-volume information for each critical band width of the noise. Then, the correction unit 18 corrects the audio-division-spectrum information based on the noise-division-spectrum information, and outputs the resultant correction-division-spectrum information. In this way, the negative impact of the noise exerted on the feeling of the audio sound to the auditory sense of the human or user can be reduced. Thus, the minimum necessary process for each frequency band can be provided to the auditory sense of the human, as well as the amount of information to be carried by the audio information can be substantially reduced. Therefore, the cost required for correcting the audio information can be significantly saved, without degrading, in any way, the accuracy of the auditory sense of the human for catching the sound.

Accordingly, as compared with the case of reducing the negative impact of the noise exerted on the feeling of the audio sound to the auditory sense of the human or user for each frequency band greater than the critical band width, the risk that some corrected audio sound may provide the uncomfortable feeling to the auditory sense of the human can be securely reduced. Further, as compared with the case of reducing the negative influence of the noise on the feeling of the audio sound to the auditory sense of the human or user for each frequency band smaller than the critical band width, the time required for correcting the audio sound can be substantially reduced.

Further, according to the first embodiment, the correction unit 18 is provided to include the difference computing unit 34 and computing unit 35. The difference computing unit 34 is used for calculating the difference between the audio-division-spectrum information and the noise-division-spectrum information so as to obtain the difference information, and then outputs the so-obtained difference information. In this way, the correction unit 18 can obtain the sound volume masked by the noise for the audio sound outputted from the audio-information output unit 13. Then, the computing unit 35 is operated to weight the difference information and audio-division-spectrum information, and then add them together. As a result, the sound volume of each audio sound outputted from the audio-information output unit 13 can be corrected with the sound volume masked by the noise.

In this way, for each audio sound outputted from the audio-information output unit 13, the feeling of the impact or effect of the audio sound to the auditory sense of the human after this audio sound is masked by the noise and then corrected by the sound device 10 can be made substantially the same as the feeling of the impact or effect of the audio sound to the auditory sense of the human before this audio sound is masked by the noise (or when this audio sound is not yet masked by the noise). In this case, since the audio-division-spectrum information and difference information are respectively weighted by the computing unit 35, the effect of the correction on the auditory sense of the human or user can be optionally controlled.

Further, in the first embodiment, the sound device 10 is provided to include the output alteration unit 42. Generally, the strength of the impact exerted from various audio sounds, respectively having the same sound pressure but being different in the frequency from one another, to the auditory sense of the human, varies with the frequency. Therefore, in order to make the sound of each frequency have the same strength of the impact to the auditory sense of the human, the aforementioned isosensitivity curve of the magnitude of the sound is provided, as the curve for expressing the amplification factor for the sound of each frequency over the frequency. Namely, based on such an isosensitivity curve of the magnitude of the sound, the output alteration unit 42 is operated to increase, decrease or maintain the sound-volume information for each critical band width outputted from the correction unit 18. Thus, for each audio sound outputted from the audio-information output unit 13, the strength of the impact exerted on the auditory sense of the human can be made substantially the same between the respective audio sounds, even though the frequencies of such audio sounds are different from one another.

In the first embodiment, the noise-division-spectrum output unit 16 is provided to include the noise-division-spectrum storage unit 27 and noise-information pick-out unit 28. The noise-division-spectrum storage unit 27 is provided for storing therein the sound-volume information for each critical band width of the noise, and the noise-information pick-out unit 28 serves to obtain the sound volume information, for each critical band width of the noise associated with the environment, from the noise-division-spectrum storage unit 27, and then output the so-obtained information. This can eliminate a need for operating the noise-division-spectrum output unit 16 to analyze and pick out the sound volume information for each critical band width of the noise from the noise of the environment. Thus, as compared with the case in which the noise of the environment is first obtained, and this noise is analyzed for each frequency to obtain each sound spectrum, and then the so-obtained sound spectrum is further analyzed to obtain the corresponding sound-volume information for each critical band width, and finally the resultant noise-division-spectrum is outputted, the time required for outputting the sound-volume information for each critical band width of the noise associated with the environment can be significantly reduced. Accordingly, the delay in correcting the change of the environmental noise can be substantially avoided.

Further, in the first embodiment, the aforementioned audio-information output unit 13, analysis unit 14, noise-division-spectrum output unit 16, audio-division-spectrum output unit 17 and correction unit 18 are all mounted on the motorcycle 12. Thus, when the user listens to the audio sound outputted from the audio-information output unit 13 while the motorcycle 12 is running, each audio sound masked by the noise associated with the running of the motorcycle 12 can be corrected as described above. Therefore, the feeling of the impact or effect or the audio sound outputted from the audio-information output unit 13 to the auditory sense of the human after this audio sound is masked by the noise associated with the running of the motorcycle 12 and then corrected by the sound device 10 can be made substantially the same as the feeling of the impact or effect of the audio sound to the auditory sense of the human before this audio sound is masked by the noise (or when this audio sound is not yet masked by the noise).

In the first embodiment, the noise-information pick-out unit 28 can serve to obtain the sound-volume information for each critical band width of the noise substantially associated with the running speed of the motorcycle 12 from the noise-division-spectrum storage unit 27, and then output the so-obtained sound-volume information. In this way, the audio sound outputted from the audio-information output unit 13 can be corrected during the running of the motorcycle 12, while this audio sound outputted from the audio-information output unit 13 is masked by the noise of the wind generated due to the relative speed between the motorcycle 12 and the air surrounding the motorcycle 12 as well as by the noise generated from each tire of the motorcycle 12 as well as from the road surface during the running of the motorcycle 12. Thus, the so-corrected audio sound can be caught by the human or user, as the audio sound substantially the same as the sound that can be listened before this sound is masked (or when this sound is not yet masked), by such a noise of the wind generated due to the relative speed between the motorcycle 12 and the air surrounding the motorcycle 12 as well as by such a noise generated from each tire of the motorcycle 12 as well as from the road surface.

Additionally, in the first embodiment, the noise-information pick-out unit 28 can also select and obtain the sound-volume information for each critical band width of the noise substantially associated with the rotation speed of the output shaft of the internal combustion engine for driving the motorcycle 12 from the noise-division-spectrum storage unit 27, and then output the so-obtained sound-volume information. With this operation, the audio sound outputted from the audio-information output unit 13 can be corrected during the running of the motorcycle 12, while this audio sound outputted from the audio-information output unit 13 is masked by the mechanical noise associated with or related to the change of the rotation speed of the output shaft of the internal combustion engine for driving the motorcycle 12 during the running of the motorcycle 12. As a result, the so-corrected audio sound can be caught by the human or user, as the audio sound substantially the same as the sound that can be listened before this sound is masked (or when this sound is not yet masked) by the mechanical noise associated with the change of the rotation speed of the output shaft of the internal combustion engine for driving the motorcycle 12.

As described above, in the first embodiment, the sound control device 11 includes the noise-information pick-out unit 28, analysis unit 14, audio-division-spectrum output unit 17 and correction unit 18. The analysis unit 14 serves to output the sound-spectrum information of the audio information inputted thereto. With this operation, the audio information can be processed for each frequency. The audio-division-spectrum output unit 17 serves to output the audio-division-spectrum information indicative of the sound-volume information for each critical band width of the sound spectrum of the audio information. The noise-information pick-out unit 28 is connected with the noise-division-spectrum storage unit 27 provided to store therein the sound-volume information for each critical band width of the noise, and serves to obtain the noise-division-spectrum information indicative of the sound-volume information for each critical band width of the noise associated with the environment, and then output the so-obtained information. The correction unit 18 is provided to correct the audio-division-spectrum information based on the noise-division-spectrum information, and then output the correction-division-spectrum information indicative of the corrected audio-division-spectrum information.

In this way, the negative impact of the noise exerted on the feeling of the audio sound to the auditory sense of the human or user can be substantially reduced. Thus, the minimum necessary process for each frequency band can be provided to the auditory sense of the human, as well as the amount of information to be carried by the audio information can be substantially reduced. Therefore, the cost required for correcting the sound information can be significantly saved, without degrading, in any way, the accuracy of the auditory sense of the human for catching the sound.

Thus, as compared with the case of reducing the negative impact of the noise exerted on the feeling of the audio sound to the auditory sense of the human or user for each frequency band greater than the critical band width, the risk that each corrected audio sound may provide the uncomfortable feeling to the auditory sense of the human can be securely reduced. Further, as compared with the case of reducing the negative influence caused by the noise on the feeling of the audio sound to the auditory sense of the human or user for each frequency band smaller than the critical band width, the time required for correcting the audio sound can be significantly reduced.

The sound device 10 further includes the isoselectivity-curve storage unit 49, sound-volume operation unit 51 and isoselectivity-curve pick-out unit 52. As described above, the strength of the impact exerted from various audio sounds, respectively having the same sound pressure but being different in the frequency from one another, to the auditory sense of the human, generally varies with the frequency. Further, the frequency dependency of the strength of the impact exerted from the various audio sounds, respectively having the same sound pressure but being different in the frequency from one another, to the auditory sense of the human, varies with the magnitude of the sound pressure.

The isosensitivity-curve storage unit 49 is provided to store therein the plurality of isosensitivity curves respectively depending on the sound volumes of the various audio sounds, while such isosensitivity curves are respectively correlated with the magnitudes of the audio sounds. The sound-volume operation unit 51 serves to input the sound-volume setting information for controlling the sound volume of each audio sound outputted from the sound device 10. With this configuration, the user can control the sound volume of each audio sound outputted from the sound device 10, as needed, by operating the sound-volume operation unit 51.

As described above, the sound-volume operation unit 51 outputs the sound-volume setting information for controlling the sound volume of the audio sound outputted from the sound device 10 to the isosensitivity-curve pick-out unit 52. Then, the isosensitivity-curve pick-out unit 52 selects and obtains a certain isosensitivity curve of the magnitude of the sound corresponding to the sound-volume setting information from the isosensitivity-curve storage unit 49, and then outputs the information on the so-selected isosensitivity-curve. Thereafter, the output alteration unit 42 is operated to increase, decrease or maintain the sound-volume information for each critical band width outputted from the correction unit 18 based on the isosensitivity curve of the magnitude of the sound corresponding to the sound-volume setting information outputted from the isosensitivity-curve pick-out unit 52.

In this way, for each audio sound outputted from the audio-information output unit 13, the strength of the impact exerted on the auditory sense of the human can be made substantially the same between the respective audio sounds, even though the frequencies of such audio sounds are different from one another. Further, even in the case in which the setting condition of the sound volume is changed, the above configuration can successfully prevent the strength of the impact to the auditory sense of the human from being unduly changed by the difference between the frequencies.

The sound device 10 further includes the conversion unit 39. This conversion unit 39 receives the correction-division-spectrum information, and changes this correction-division-spectrum information into the sound-volume information smaller than the preset sound volume, and then outputs the so-changed sound-volume information. This can successfully prevent the correction-division-spectrum from being changed into the audio information including the sound volume within the range that cannot be outputted. Namely, even in the case of the sound-volume information of the audio information of the frequency band, for which the minimum audible limit is raised after the sound-volume information is masked with the noise, there is a risk that the sound volume increased by the correction may become unduly large, thus providing the uncomfortable feeling to the auditory sense of the human. Therefore, by appropriately controlling such a sound volume that is obtained by changing the correction-division spectrum into the audio information to be smaller than the sound volume within the range that may cause the uncomfortable feeling to the auditory sense of the human, such a risk that the audio sound may provide the uncomfortable feeling to the auditory sense of the human can be securely reduced or eliminated, when the audio sound is outputted after the correction-division spectrum is converted into this audio sound.

The conversion unit 39 can change the sound-volume information exceeding the preset sound volume, among the computation results provided thereto, into the sound-volume information of this preset sound volume. With this operation, when the correction-division spectrum is changed into the audio information, the audio information including the sound volume within the range that cannot be outputted can be changed into the sound-volume information within the range that can be outputted. Then, once the so-changed sound-volume information is further changed into the audio sound, the resultant audio sound will be outputted.

The sound device 10 further includes the conversion unit 39. This conversion unit 39 receives the correction-division-spectrum information, and changes this correction-division-spectrum information into the sound-volume information smaller than the preset sound volume, and then outputs the so-changed sound-volume information. This can successfully prevent the correction-division-spectrum from being changed into the audio information including the sound volume within the range that cannot be outputted. Namely, even in the case of the sound-volume information of the audio information of the frequency band, for which the minimum audible limit is raised after the sound-volume information is masked with the noise, there is a risk that the sound volume increased by the correction may become unduly large, thus providing the uncomfortable feeling to the auditory sense of the human. Therefore, by appropriately controlling such a sound volume that is obtained by changing the correction-division spectrum into the audio information to be smaller than the sound volume within the range that may cause the uncomfortable feeling to the auditory sense of the human, such a risk that the audio sound may provide the uncomfortable feeling to the auditory sense of the human can be securely reduced or eliminated, when the audio sound is outputted after the correction-division spectrum is converted into this audio sound.

The conversion unit 39 can change the sound-volume information exceeding the preset sound volume, among the computation results provided thereto, into the sound-volume information of this preset sound volume. With this operation, when the correction-division spectrum is changed into the audio information, the audio information, including the sound volume within the range that cannot be outputted, can be changed into the sound-volume information within the range that can be outputted. Then, once the so-changed sound-volume information is further changed into the audio sound, the resultant audio sound will be outputted.

The sound device 10 also includes the dynamic range converter 23. This dynamic range converter 23 serves to change the audio information outputted from the audio-information output unit 13 by multiplying the sound volume indicated by the sound-volume information of this audio information outputted from the audio-information output unit 13 by a real number. Thus, the audio information including the sound volume that cannot be outputted can be changed into the audio information within the range of the sound volume that can be outputted. In this case, the dynamic range converter 23 multiplies the sound volume indicated by the sound-volume information of the audio information by the real number. Therefore, when the audio information changed within the range of the sound volume that can be outputted is further changed into the audio sound, the proportion or balance of the sound volume between the audio sound of a relatively small sound volume included in the so-changed audio sound and the audio sound of a relatively great sound volume included in the so-changed audio sound can be kept appropriately. This can adequately prevent the resultant audio sound from providing the uncomfortable feeling to the auditory sense of the human.

Second Embodiment

Figure 8:
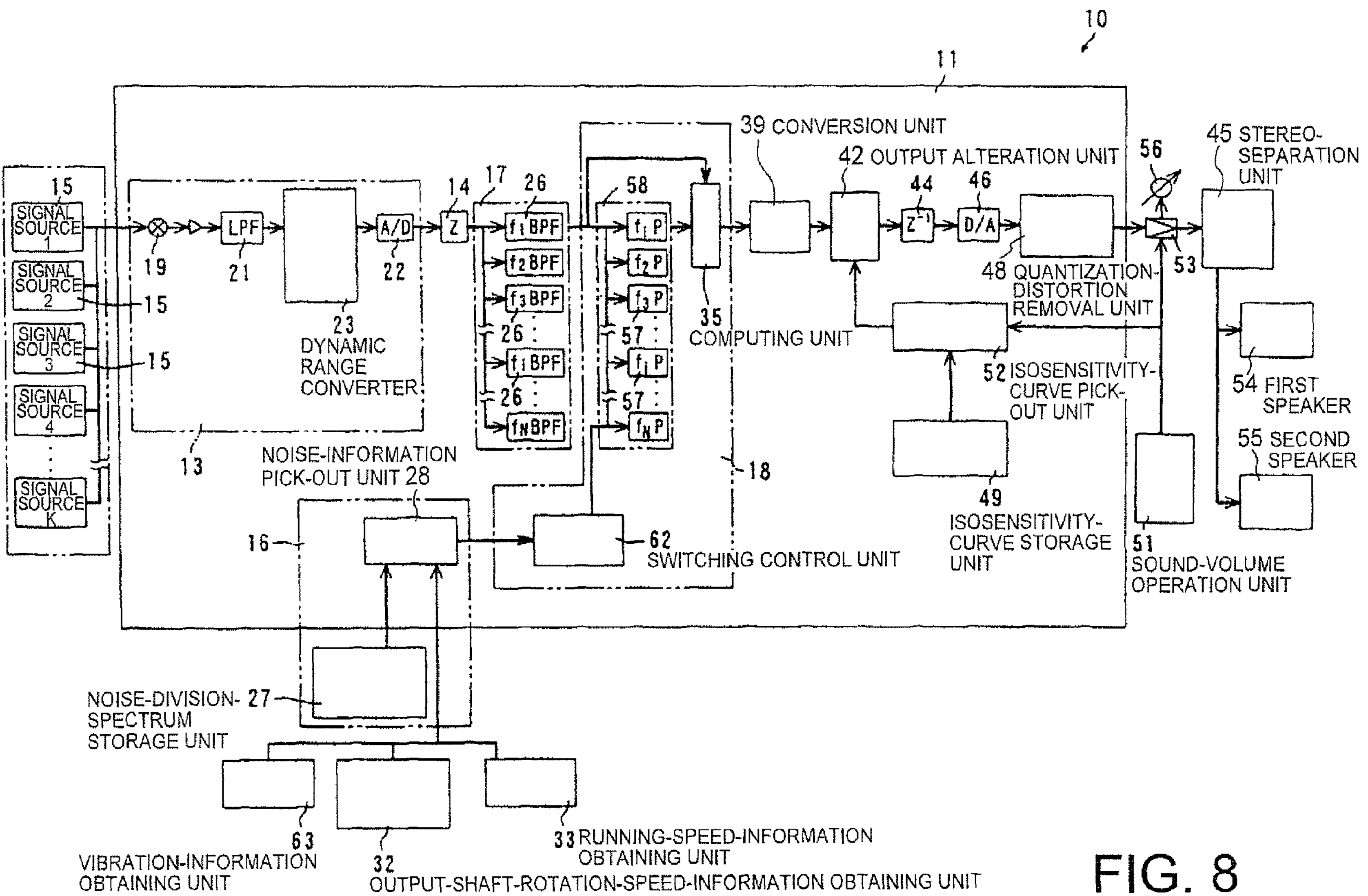
FIG. 8 is a block diagram illustrating the construction of the sound device 10 according to a second embodiment of the present invention.

FIG. 8 is the block diagram illustrating the construction of the sound device 10 according to the second embodiment of the present invention. This sound device 10 according to the second embodiment is similar to the sound device 10 according to the above first embodiment, and thus the following description on the second embodiment will be focused on features thereof respectively different from the first embodiment. First, in this second embodiment, the correction unit 18 includes a switching unit 58 including a plurality of division-switching units 57, a switching control unit 62, and the computing unit 35. Each of the division-switching units 57 can block or pass therethrough the audio-division-spectrum information for each critical band. The switching control unit 62 can serve to receive the noise-division-spectrum information inputted thereto, and then drive the switching unit 58 based on the inputted noise-division-spectrum information, so as to operate each division-switching unit 57 to block or pass therethrough the audio-division-spectrum information.

The computing unit 35 can receive the audio-division-spectrum information and each output of the switching unit 58, and then weight the audio-division-spectrum information and output of the switching unit 58, and finally add them together.

The analysis unit 14 and audio-division-spectrum output unit 17 in the second embodiment are respectively the same as those provided in the first embodiment. However, in this embodiment, the audio-division-spectrum information outputted from the audio-division-spectrum output unit 17 is inputted to the switching unit 58 as well as to the computing unit 35, respectively included in the correction unit 18. Each of the division-switching units 17 included in the switching unit 58 can correspond to each critical band width set by each corresponding band pass filter 26 of the audio-division-spectrum output unit 17. Therefore, the number of the division-switching units 57 is the same as the number of the band pass filters 26, and thus these components 57 and 26 are respectively provided in the one to one relationship.

The sound-volume information for each critical band width passed through the audio-division-spectrum output unit 17 is allowed to be passed through each corresponding division-switching unit 57 or blocked by this unit 57. For each division-switching unit 57, a state in which each signal indicative of the audio-division-spectrum information can be passed therethrough will be referred to as the "passing state", while a state in which the signal is blocked will be referred to as the "blocking state". Namely, each of the division-switching units 57 is independently controlled by the switching-control unit 62, so as to be switched into either of the passing state or blocking state. The switching-control unit 62 is electrically connected with a noise-division-spectrum pick-out unit, and thus the noise-division-spectrum information can be inputted to the unit 62 from this noise-division-spectrum pick-out unit.

The switching-control unit 62 stores therein information on a preset value as the sound-volume information for each critical band width of the noise-division-spectrum information. This switching-control unit 62 controls a certain switching unit 57, which corresponds to the critical band width greater than the preset value of the sound-volume information of the noise-division-spectrum information, to be in the passing state. Meanwhile, each switching unit 57, which corresponds to the critical band width smaller than the preset value of the sound-volume information of the noise-division-spectrum information, is controlled by the switching control unit 62 to be in the blocking state. In this way, the switching unit 58 can pass therethrough the audio-division-spectrum information corresponding to the critical band width greater than the preset value of the sound-volume information of the noise-division-spectrum information, while blocking the audio-division-spectrum information corresponding to the critical band width smaller than the preset value of the sound-volume information of the noise-division-spectrum information.

Then, the division-spectrum information passed through the switching unit 58 is inputted to the computing unit 35. In addition to this division-spectrum information passed through the switching unit 58, the audio-division-spectrum information outputted from the audio-division-spectrum output unit 17 is inputted to the computing unit 35, while detouring around the switching unit 58. Thereafter, the computing unit 35 adds such two kinds of division-spectrum information, respectively inputted thereto, together. In this way, the sound-volume information of the audio-division-spectrum information can be adequately increased (e.g., doubled), in each critical band width where the sound volume of the critical band width of the noise is unduly great.

In the second embodiment, the noise-division-spectrum storage unit 27 stores therein the noise-division-spectrum information of various noises of the motorcycle 12, while such information is correlated with the magnitude of vibration of the chassis and body of the motorcycle 12. The noise-information pick-out unit 28 serves to select and obtain the sound-volume information for each critical band width of the noise related to the vibration of at least one of the chassis and body of the motorcycle 12, the rotation speed of the engine and the running speed of the motorcycle 12 from the noise-division-spectrum storage unit 27, and then outputs the so-obtained information. In this embodiment, the vibration of at least one of the chassis and body of the motorcycle 12, the rotation speed of the engine and the running speed of the motorcycle 12 are collectively referred to as the "environment".

As described above, the noise generated from the motorcycle 12 is also related to the vibration of the chassis and body of the motorcycle 12. While some noise is directly attributable to the vibration of the chassis or body of the motorcycle 12, other noise is indirectly attributable to the vibration of the chassis or body. More specifically, some noise is attributable to the rotation speed or rate of the engine and the state of the road surface, while other noise is attributable to the vibration of the chassis or body determined by the rotation speed or rate of the engine and the state of the road surface.

A vibration-information obtaining unit 63 is electrically connected with the noise-information pick-out unit 28, such that the information obtained by the vibration-information obtaining unit 63 can be outputted to the noise-information pick-out unit 28. This vibration-information obtaining unit 63 is connected with at least one of the chassis and body of the motorcycle 12, and serves to detect at least one of the amplitude of the vibration and the maximum acceleration associated with the vibration. With this configuration, the noise-information pick-out unit 28 can pick out the noise-division-spectrum information, corresponding to the kind of the vibration, i.e., the vibration of the chassis of the motorcycle 12 or vibration of the body thereof, the amplitude of the vibration and the maximum acceleration associated with the vibration, with respect to the vibration detected by the vibration-information obtaining unit 63, among the plurality of noise-division-spectrum information stored in the noise-division-spectrum storage unit 27. Thereafter, the noise-division-spectrum information obtained and outputted by the noise-information pick-out unit 28 is inputted to the switching control unit 62, and then used by the switching control unit 62 in such a manner as described above.

In the second embodiment, the correction unit 18 is provided to include the switching unit 58 including the plurality of division switching units 57, and further include the switching control unit 62 and computing unit 35. The plurality of division switching units 57 in the switching unit 58 can pass therethrough or block the audio-division-spectrum information for each critical band width, respectively. The switching control unit 62 controls the switching unit 58 based on the noise-division-spectrum information, so as to drive each division-switching unit 57 to pass therethrough or block the audio-division-spectrum information. In this way, the correction unit 18 can obtain or detect the frequency band masked by the noise, and then pick out the sound-volume information of the audio information of such a frequency band masked by the noise, among the audio-division-spectrum information outputted from the audio-information output unit 13.

Further, in this second embodiment, the computing unit 35 can weight the audio-division-spectrum information and each output of the switching unit 58, and then add them together. In this way, the sound-volume information of the audio information of the frequency band masked by the noise can be added to the audio-division-spectrum information of the audio information. As such, the feeling of the impact or effect of the audio sound outputted from the audio-information output unit 13 to the auditory sense of the human after this audio sound is masked by the noise and then corrected by the sound device 10 can be made substantially the same as the feeling of the impact or effect of the audio sound to the auditory sense of the human before this audio sound is masked by the noise (or when this audio sound is not yet masked by the noise). In this case, since the audio-division-spectrum information and each output of the switching unit 58 are respectively weighted by the computing unit 35, the impact or effect of the audio sound after the correction on the auditory sense of the human can be optionally controlled.

In the second embodiment, the noise-information pick-out unit 28 serves to select and obtain the sound-volume information for each critical band width of the noise, related to the vibration of at least one of the chassis and body of the motorcycle 12, from the noise-division-spectrum storage unit 27, and then outputs the so-obtained information. In this way, the audio sound outputted from the audio-information output unit 13 can be corrected during the running of the motorcycle 12, while this audio sound outputted from the audio-information output unit 13 is masked during the running of the motorcycle 12 by the noise generated due to the vibration of at least one of the chassis and body of the motorcycle 12. Consequently, the so-corrected audio sound can be caught by the user as the audio sound substantially the same as the audio sound that might be listened before this audio sound is masked (or when this audio sound is not yet masked) by the noise generated due to the vibration of at least one of the chassis and body of the motorcycle 12.

Third Embodiment

Figure 9:
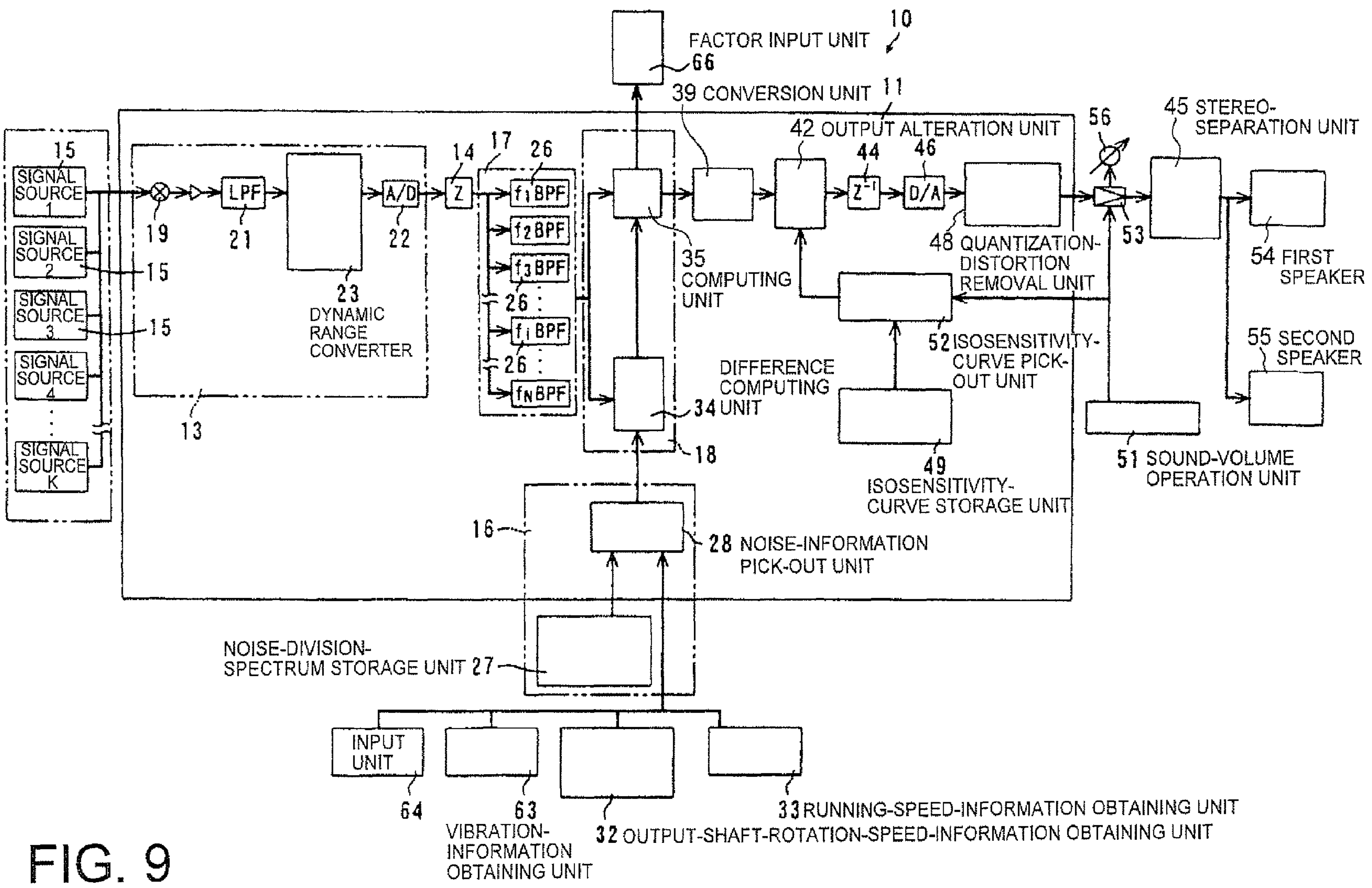
FIG. 9 is a block diagram illustrating the construction of the sound device 10 according to a third embodiment of the present invention.
Figure 10:
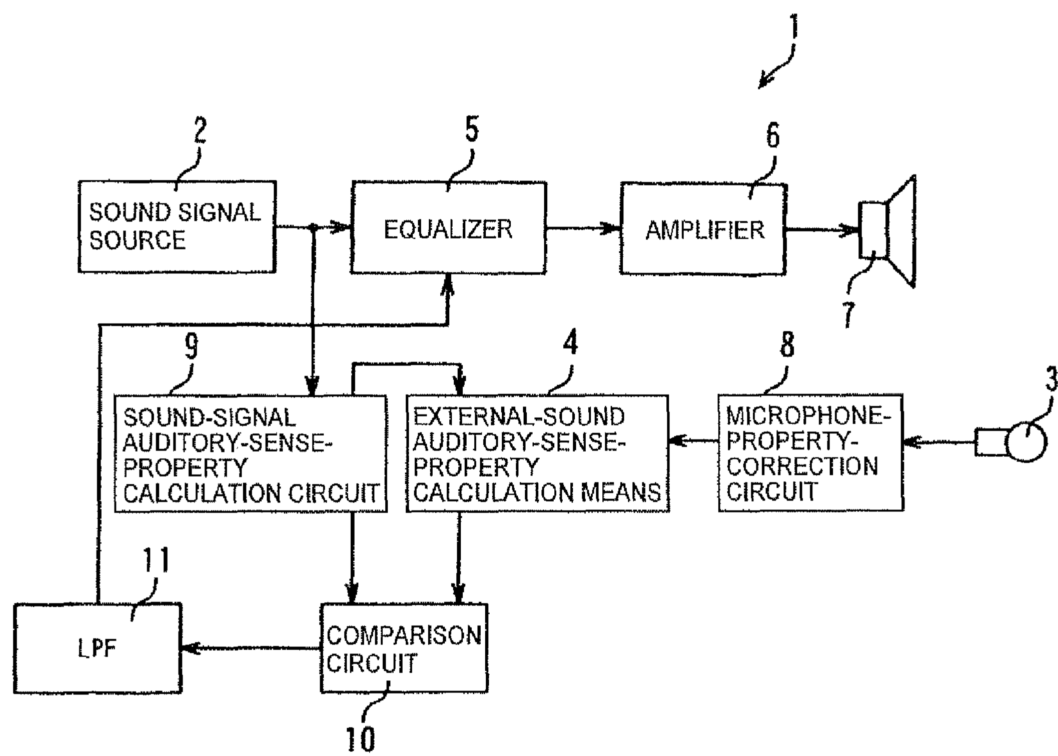
FIG. 10 is the block diagram illustrating the construction of the audio playback unit or device 1 (i.e., the sound device) according to the related art.

FIG. 9 is the block diagram illustrating the construction of the sound device 10 according to the third embodiment of the present invention. This sound device 10 according to the third embodiment is similar to the sound device 10 according to the above first embodiment, and thus the following description on the third embodiment will be focused on features thereof different from the first embodiment. First, in this third embodiment, the sound device 10 further includes an input unit 64. This input unit 64 can receive surrounding information of the motorcycle 12. In this case, the noise-information pick-out unit 28 selects and obtains the sound-volume information for each critical band width of the noise from the noise-division-spectrum storage unit 27 corresponding to the surrounding information inputted thereto from the input unit 64, and then outputs the so-obtained information.

The input unit 64 can be operated by the user of the sound device 10 in a plurality of modes, respectively corresponding to the surrounding information. The surrounding information includes information concerning conditions of a place where the motorcycle 12 runs. For instance, this information includes the information on whether or not the place is the inside of a certain tunnel, information on whether it is rain or not, information on whether the road on which the motorcycle 12 runs is a paved road or gravel road, information on whether the road is a superhighway, expressway or ordinary road, and the like. Such information is inputted to the noise-information pick-out unit 28 after the input unit 64 is operated by the user of the sound device 10 and then the operational mode of this unit 64 is switched as needed.

In this embodiment, the noise-division-spectrum information of the plurality of noises of the motorcycle 12 is stored in the noise-division-spectrum storage unit 27, while being correlated with the surrounding information. The noise-information pick-out unit 28 selects and obtains the sound-volume information for each critical band width of the noise, corresponding to the surrounding information, the vibration of at least one of the chassis and body of the motorcycle 12, the rotation speed of the engine and the running speed of the motorcycle 12, from the noise-division-spectrum storage unit 27, and then outputs the so-obtained information. In this embodiment, the information on the place where the motorcycle 12 runs, e.g., the information on whether or not the place is the inside of the certain tunnel, information on whether it is rain or not, information on whether the road on which the motorcycle 12 runs is the paved road or gravel road, information on whether the road is the superhighway, expressway or ordinary road, and the like, will be referred to as the "surrounding information".

Namely, the noise generated from the motorcycle 12 is also associated with the surrounding information. For instance, such a noise includes the noise generated due to impingements of rain drops against the body of the motorcycle 12, the noise generated when each tire is contacted with or detached from the gravel road, and the like. Further, for the auditory sense of the human or user, the feeling of the noise related to the vibration of at least one of the chassis and body of the motorcycle 12, the noise generated by the rotation of the engine, the noise associated with the running of the motorcycle 12, and the like, varies with the conditions of the place where the motorcycle 12 runs. In addition, for the auditory sense of the user, the feeling of the audio sound outputted from the first and second speakers will also vary with the conditions of the place.

The input unit 64 is electrically connected with the noise-information pick-out unit 28, such that the information can be inputted to the noise-information pick-out unit 28 from the input unit 64. With this configuration, the noise-information pick-out unit 28 can pick out the noise-division-spectrum information corresponding to the information inputted from the input unit 64, among the plurality of noise-division-spectrum information stored in the noise-division-spectrum storage unit 27.

The sound device 10 further includes a factor input unit 66. This factor input unit 66 is adapted for inputting at least one of a preset first factor that is multiplied by the audio-sound-spectrum information by the computing unit 35 and a preset second factor that is multiplied by the mask-sound-volume by the computing unit 35. Namely, in this embodiment, the at least one of the first and second factors is inputted from the factor input unit 66, and then the computing unit 35 adds the audio-division-spectrum information multiplied by the preset first factor and the mask-sound-volume information multiplied by the preset second factor. The factor input unit 66 is provided to be optionally operated in a plurality of modes by the user of the sound device 10. Such operational modes are set respectively corresponding to a plurality of values respectively used as the first factor as well as corresponding to a plurality of other values respectively used as the second factor. For instance, the first and second factors respectively include four kinds of real numbers, e.g., 1, 1.2, 1.5 and 2.

In the third embodiment, the analysis unit 14, audio-division-spectrum output unit 17 and correction unit 18 are respectively provided to a helmet of the user. Further, the noise-information pick-out unit 28, conversion unit 39, output alteration unit 42, analysis return unit 44, D/A converter 46, quantization-distortion removal unit 48, sound-volume amplifier 53 and stereo-separation unit 45 are also provided to the helmet. In this third embodiment, each of the electrical connections between the audio-information output unit 13 and the analysis unit 14, between the isosensitivity-curve pick-out unit 52 and the output alteration unit 42, between the noise-division-spectrum storage unit 27 and the noise-information pick-out unit 28, between the sound-volume operation unit 51 and the sound-volume amplifier 53, and between the sound-volume amplifier 53 and the sound-volume meter 56, is achieved by radio-wave transmission. Further, in the third embodiment, the first and second speakers 54, 55 provided to the helmet may be earphones, usual headphones or special headphones utilizing the bone-transmission mechanism, respectively.

As described above, in the third embodiment, the sound device 10 further includes the input unit 64 adapted for inputting the surrounding information of the motorcycle 12. With this configuration, the user can input the surrounding information of the motorcycle 12 by operating the input unit 64. Then, the noise-information pick-out unit 28 can select and obtain the sound-volume information for each critical band width of the noise from the noise-division-spectrum storage unit 27, corresponding to the surrounding information inputted from the input unit 64, and then output the so-obtained information. In this way, the audio sound outputted from the audio-information output unit 13 can be corrected during the running of the motorcycle 12, corresponding to the surrounding information, other than the information on the mechanical conditions of the motorcycle 12, among the information concerning the noise.

The computing unit 35 serves to add the audio-division-spectrum information multiplied by the preset first factor and the difference information multiplied by the preset second factor. In this case, by appropriately changing the relative proportion between the audio-division spectrum information and the difference between the audio-division spectrum information and the noise-division spectrum information, the effect of the correction on the auditory sense of the human or user can be properly controlled.

In addition, as described above, the sound device 10 includes the factor input unit 66 adapted for inputting the at least one of the first and second factors. This configuration can allow the user to appropriately change the proportion between the audio-division spectrum information and the difference between the audio-division spectrum information and the noise-division spectrum information, thereby enabling the user to properly control the effect of the correction on the auditory sense of the user.

Further, as described above, the analysis unit 14, audio-division-spectrum output unit 17 and correction unit 18 are provided to the helmet. With the manner of provision of such units, if the other components or parts of the sound device 10 than the analysis unit 14, audio-division-spectrum output unit 17 and correction unit 18 are respectively provided to the motorcycle 12, the audio sound can be listened, while the user is driving the motorcycle 12, with the unnecessary impact of the noise of the environment substantially eliminated. Further, as compared with the case in which the analysis unit 14, audio-division-spectrum output unit 17 and correction unit 18 are respectively provided to the body of the motorcycle 12, the structure of the motorcycle 12 can be considerably simplified. Further, each of the analysis unit 14, audio-division-spectrum output unit 17 and correction unit 18 respectively provided to the helmet does not depend on the model or type of the motorcycle 12. Therefore, if the other components than such units 14, 17 and 18 are respectively provided to the body of the motorcycle 12, the user can ride any model or type of the motorcycle 12, while wearing the same helmet. Of course, in such a case, the user can listen or enjoy the audio sound, while the negative impact of the noise associated with the motorcycle 12 that the user rides on can be substantially eliminated.

Fourth Embodiment

The sound device 10 according to the fourth embodiment is similar to the sound device 10 according to the above first embodiment, and thus the following description on the fourth embodiment will be focused on features thereof different from the first embodiment. For instance, in the above first to third embodiments, the audio-division-spectrum information and the division-spectrum information of each audio sound are added together, while the critical band width is matched therebetween. In some cases, however, if the audio sound in a certain critical band width has the frequency close to another adjacent critical band width, such an audio sound may be masked by the noise-division-spectrum information included in this adjacent critical frequency band width.

In the fourth embodiment, the spectrum information, in which a relatively small sound volume is set to be equal to a relatively great sound volume, among two sound volumes of two critical band widths respectively adjacent to each other in the mask-sound-volume information, will be referred to as the "extended-mask-sound-volume information". Namely, in this fourth embodiment, the computing unit 35 is adapted for correcting the audio-division-spectrum information based on such an extended mask-sound volume.

More specifically, the computing unit 35 can serve to add the division-spectrum information of the audio sound of the sound volume for each critical band width indicated by the extended-mask-sound-volume information to the audio-division-spectrum information. This addition can successfully prevent the audio-division spectrum information of the frequency close to the adjacent critical frequency band width, among the audio-division-spectrum information included in the certain critical band width, from being masked by the noise-division-spectrum information included in this adjacent critical frequency band.

(Variation)

In the above first to fourth embodiments, the plurality of signal sources 15 are provided. In another embodiment, however, only one signal source 15 may be provided. Further, in the above first to fourth embodiments, the signal-source selection means 19 has been described as one provided for selecting only one signal source 15 among the plurality of signal sources 15. In another embodiment, however, this signal-source selection means may be configured for overlapping signals, one on another, respectively outputted from one or more signal sources 15 among the plurality of signal sources 15.

In the first to fourth embodiments, the noise-information pick-out unit 28 is configured to be connected with a proper tachometer or speedometer. However, in another embodiment, this noise-information pick-out unit may be connected with an appropriate component adapted for detecting a period of ignition of the ignition plug provided in the internal combustion engine, or otherwise connected directly and electrically with a suitable component adapted for detecting the rotation speed of each tire. With such configuration, the noise-information pick-out unit can deal with any change of the environment in a shorter time, as compared with the case in which the noise-information pick-out unit obtains the information on the environment from the tachometer or speedometer.

Further, in the first to fourth embodiments, the sound device 10 is mounded on the motorcycle 12. In another embodiment, however, this sound device may be configured to include only the sound-information output unit, analysis unit, noise-division-spectrum output unit, audio-division-spectrum output unit and correction unit. For instance, in another embodiment, this sound device may be mounted on any other transport means, such as a car, a train, an airplane, a ship or the like. Alternatively, this sound device may be installed in a factory.

Additionally, in this sound device, the sound-information output unit, analysis unit, noise-division-spectrum output unit, audio-division-spectrum output unit and correction unit may be provided integrally with one another, or otherwise independently of one another.

In the above first, third and fourth embodiments, the computing unit 35 is provided for calculating the smaller one of the sound volumes of the audio-division-spectrum information and noise-division-spectrum information for each critical band width, and then adding the division-spectrum information of the audio sound of the sound volume corresponding to the calculated smaller sound volume to the audio-division-spectrum information. However, in another embodiment, this computing unit may be configured to add the division-spectrum information of the audio sound corresponding to the sound volume indicated by the difference information to the audio-division-spectrum information.

In the third embodiment, the factor input unit 66 has been described as one means for setting the first and second factors as the four kinds of discontinuous values. In another embodiment, however, this factor input unit may be configured to select the first and second factors from a certain range of finite continuous real numbers, or otherwise may be configured to input any given appropriate numerical values.

Further, the configuration, in which the vibration-information obtaining unit 63 or like component, as described in each of the above second and third embodiments, is included in the above first or fourth embodiment, may be implemented. Alternatively, the configuration, in which the input unit 64 or like component, as described in the third embodiment, is further included in each of the first, second and fourth embodiments, may be practiced. Alternatively, the configuration, in which the factor input unit 66 or like component, as described in the third embodiment, is further included in the first or fourth embodiment, may be put into effect. Further, in the construction similar to the third embodiment, the vibration-information obtaining unit 63, as described in the above second, third or fourth embodiment, may be removed therefrom.

In the above first to fourth embodiments, the noise-division-spectrum output unit 16 includes the noise-division-spectrum storage unit 27, and the noise-information pick-out unit 28 is configured to obtain the noise-division-spectrum information from the noise-division-spectrum storage unit 27, and then outputs the so-obtained noise-division-spectrum information. However, in another embodiment, the noise-division-spectrum output unit may include a noise-sound-spectrum storage unit adapted for storing therein the sound-spectrum information of the plurality of noises and a noise-spectrum conversion unit adapted for changing the sound-spectrum information of each noise into the noise-division-spectrum information, wherein the noise-information pick-out unit may be configured to pick out and output the noise-division-spectrum information from the noise-spectrum conversion unit.

In the above first to fourth embodiments, the correction-division-spectrum information outputted from the correction unit 18 is further changed and corrected, based on each corresponding isosensitivity curve by the output alteration unit 42. However, in another embodiment, the sound device may include the equalizer, wherein the equalizer can serve to correct the information based on each isosensitivity curve. Specifically, this equalizer is designed to obtain the sound-spectrum information by analyzing the audio information inputted thereto, and increase, decrease or maintain the sound volume, individually, for each frequency, and then return each processed sound-volume spectrum to the audio information.

This equalizer is provided on the side of the first and second speakers 54, 55 relative to the D/A converter 46, in order to analyze the analog audio information inputted thereto, based on the frequency, and then correct the analyzed audio information, in the same manner as performed by the output alteration unit 42. Namely, this equalizer is provided for suitably altering the sound-volume range of the sound-spectrum information of the analog audio information. In the frequency band lower than 100 Hz or higher than 10 kHz, the sound volume is increased in accordance with the isosensitivity curve of the magnitude of the sound. Meanwhile, in the frequency band between 2 kHz to 4 kHz, the sound volume is decreased in accordance with the isosensitivity curve of the magnitude of the sound. Further, in the vicinity of 1000 kHz, the sound volume is maintained. Thereafter, the equalizer will return each processed sound-volume spectrum to the audio information.

Further, in the above first to fourth embodiments, the sound device 10 includes the first and second speakers 54, 55. In another embodiment, however, the sound device 10 may be configured to include a terminal or terminals for the connection with each speaker. With such provision of the terminal or terminals, at least one of the speakers, earphone, headphone and special headphone utilizing the bone-transmission mechanism can be optionally connected with the sound device 10.

As stated above, while several preferred embodiments of the present invention have been shown and described, it should be construed that any suitable modifications and/or alterations can be made to such embodiments, without departing from the spirit and scope of this invention.

The invention claimed is:

1. A sound device comprising:

an audio-information output unit configured to output an audio information;

an analysis unit configured to receive the audio information outputted from the audio-information output unit, and then output a sound-spectrum information of the audio information inputted thereto;

an audio-division-spectrum output unit configured to receive the sound-spectrum information of the audio information, and then output an audio-division-spectrum information indicative of a sound-volume information for each critical band width of the sound-spectrum information of the audio information inputted thereto;

a noise-division-spectrum output unit configured to output a noise-division-spectrum information indicative of a sound-volume information for each critical band width of a noise; and a correction unit configured to correct the audio-division-spectrum information based on the noise-division-spectrum information, and then output a correction-division-spectrum information indicative of thus corrected audio-division-spectrum information, wherein the correction unit includes:

a difference computing unit configured to calculate a difference between the audio-division-spectrum information and the noise-division-spectrum information, and then output a difference information indicative of each calculation result of the difference; and a computing unit configured to receive the audio-division-spectrum information and the difference information, and then weight and add the audio-division-spectrum information and the difference information respectively inputted thereto.

2. A sound device comprising:

an audio-information output unit configured to output an audio information;

an analysis unit configured to receive the audio information outputted from the audio-information output unit, and then output a sound-spectrum information of the audio information inputted thereto;

an audio-division-spectrum output unit configured to receive the sound-spectrum information of the audio information, and then output an audio-division-spectrum information indicative of a sound-volume information for each critical band width of the sound-spectrum information of the audio information inputted thereto;

a noise-division-spectrum output unit configured to output a noise-division-spectrum information indicative of a sound-volume information for each critical band width of a noise; and a correction unit configured to correct the audio-division-spectrum information based on the noise-division-spectrum information, and then output a correction-division-spectrum information indicative of thus corrected audio-division-spectrum information, wherein the correction unit includes:

a switching unit including a plurality of division-switching units, each of the division-switching units being configured to pass therethrough or block the audio-division-spectrum information for each critical band width;

a switching control unit configured to receive the noise-division-spectrum information, and then control the switching unit to operate each division-switching unit so as to pass therethrough or block the audio-division-spectrum information based on the noise-division-spectrum information inputted to the switching control unit; and a computing unit configured to receive the audio-division-spectrum information and an output from the switching unit, and then weight and add the audio-division-spectrum information and the output from the switching unit.

* * * * *